United States Patent
Sakai et al.

(10) Patent No.: US 6,615,655 B1
(45) Date of Patent: Sep. 9, 2003

(54) HEAT-SENSITIVE TYPE FLOW RATE DETECTING ELEMENT AND HOLDER THEREFOR

(75) Inventors: Yuichi Sakai, Tokyo (JP); Akira Yamashita, Tokyo (JP); Motohisa Taguchi, Tokyo (JP); Tomoya Yamakawa, Tokyo (JP); Masahiro Kawai, Tokyo (JP); Kazuhiko Tsutsumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/031,148
(22) PCT Filed: May 19, 2000
(86) PCT No.: PCT/JP00/03210
§ 371 (c)(1), (2), (4) Date: Jan. 17, 2002
(87) PCT Pub. No.: WO01/88486
PCT Pub. Date: Nov. 22, 2001

(51) Int. Cl.$^7$ .................................................. G01F 1/68
(52) U.S. Cl. .................................................. 73/204.26
(58) Field of Search ...................... 73/204.26, 204.22, 73/204.25

(56) References Cited

U.S. PATENT DOCUMENTS 5,936,157 A * 8/1999 Yamashita et al. ....... 73/204.26
6,079,264 A * 6/2000 Yamakawa et al. ...... 73/204.26

* cited by examiner

Primary Examiner—Edward Lefkowitz
Assistant Examiner—Jewel V. Thompson
(74) Attorney, Agent, or Firm—Leydig, Voit & Mayer, Ltd.

(57) ABSTRACT

A flow rate detecting element measuring the flow rates of various fluids, particularly the intake air of an internal combustion engine. The flow rate detecting element has a thin film layer including a support film and a protective film on one surface of a flat substrate, a heating resistance section and a comparative resistance section thermosensitive resistor having patterns and located between the support film and the protective film. The flat substrate has a recess which penetrates the flat substrate in the thickness direction thereof and facing the heating resistance section and the comparative resistance section. A fluid flow passage communicates with the recess which faces the comparative resistance section for fluid flow into the recess. Flow rate or velocity of a fluid can be measured accurately using the heating resistance section according to the fluid temperature reported by the comparative resistance section.

17 Claims, 10 Drawing Sheets

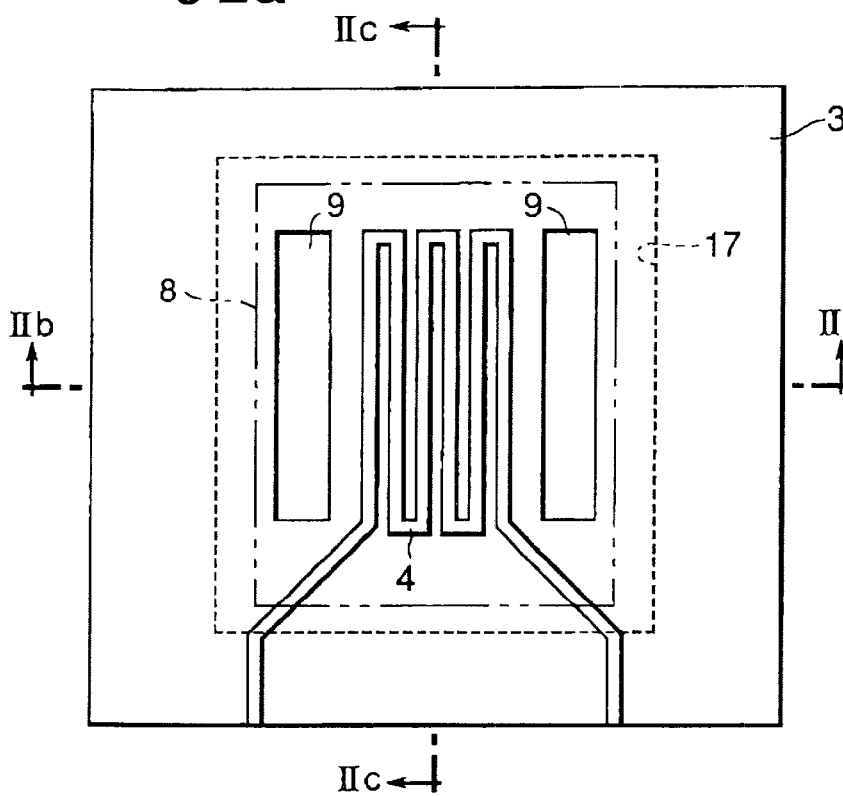
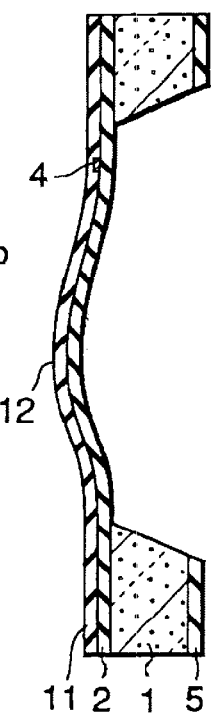
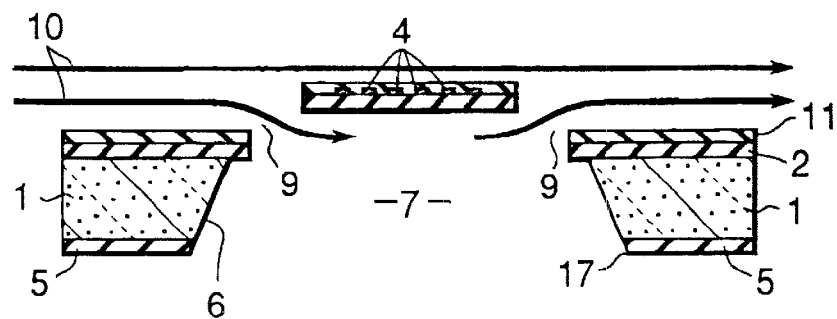

Fig 3a
Fig 3c
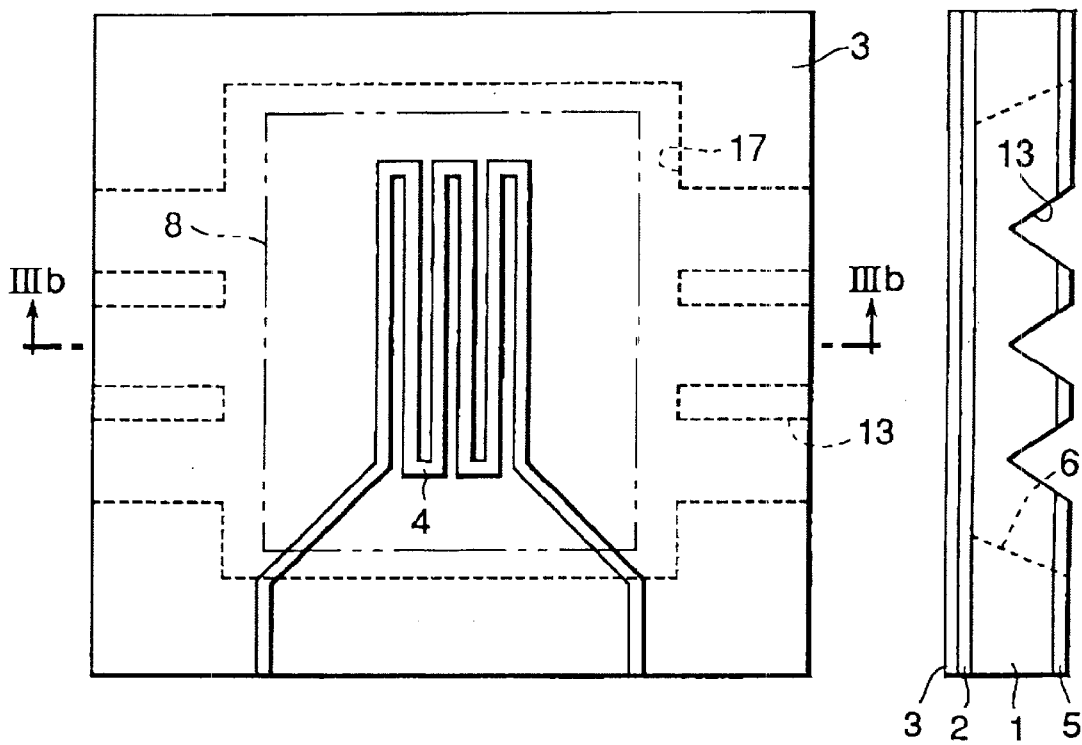
Fig 3b
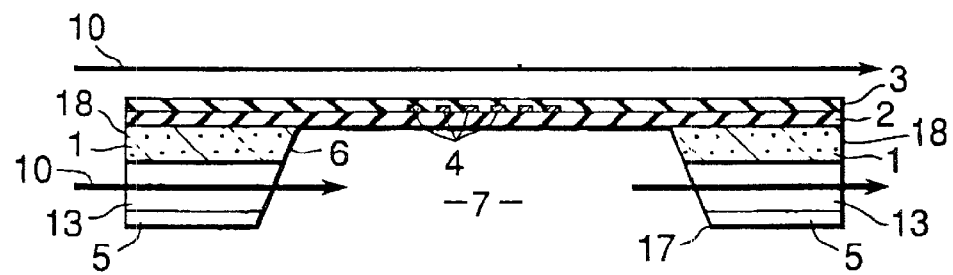

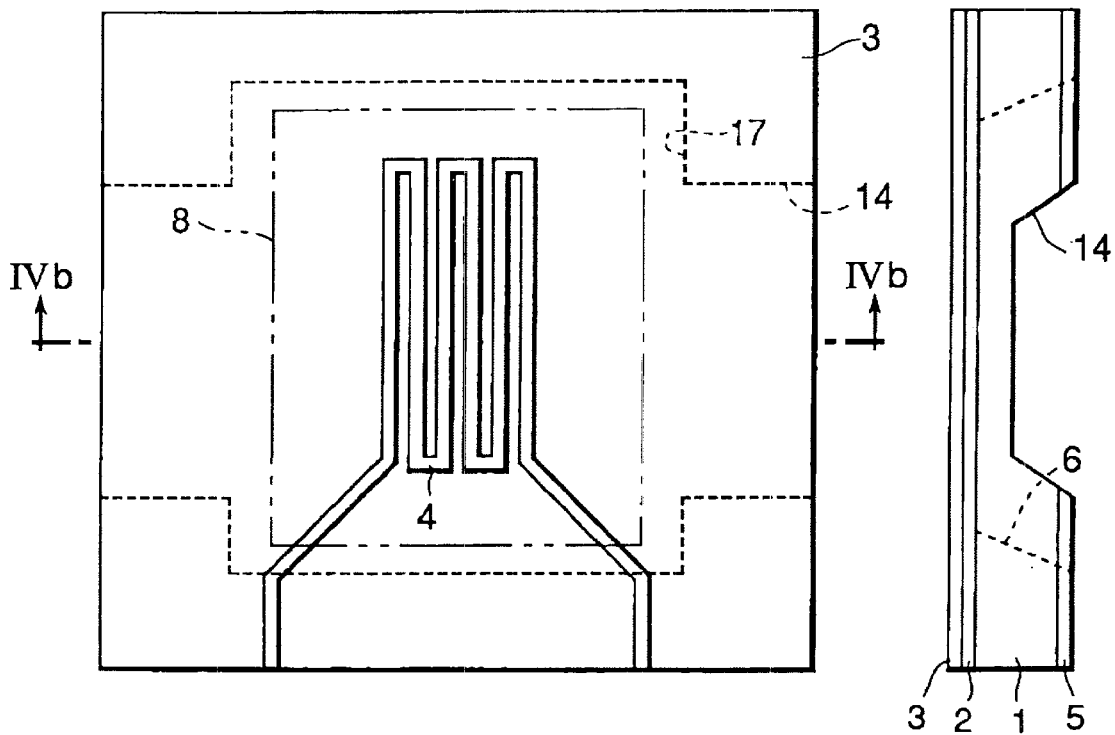
Fig 4a
Fig 4c
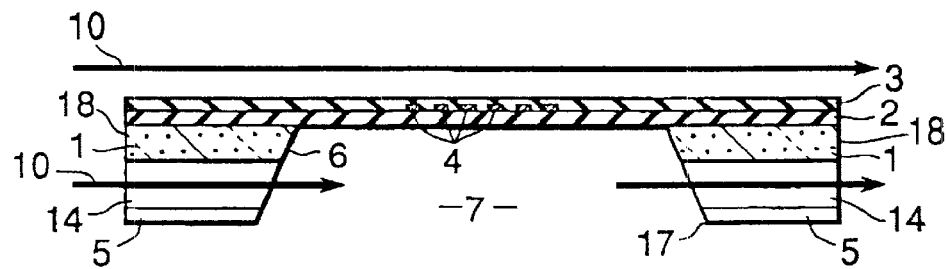
Fig 4b

Fig 5a
Fig 5c
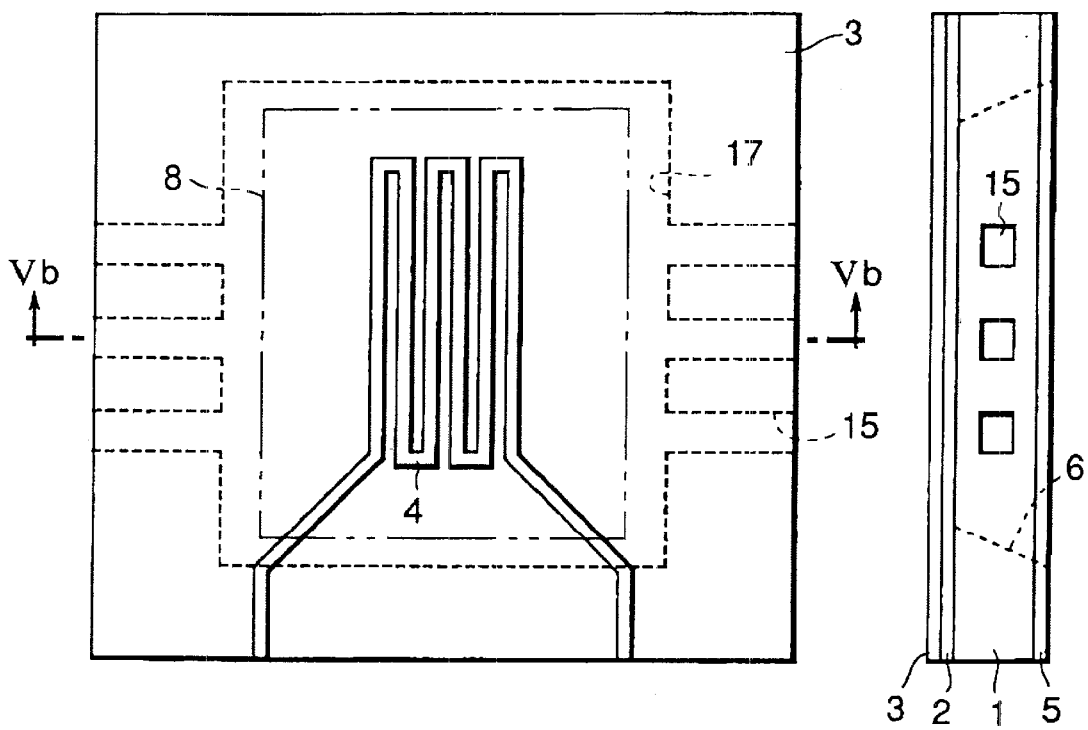
Fig 5b
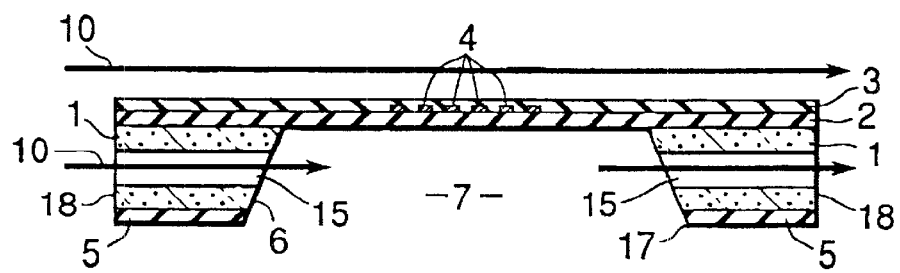

HEAT-SENSITIVE TYPE FLOW RATE DETECTING ELEMENT AND HOLDER THEREFOR

BACKGROUND OF THE INVENTION

1. Field of the Invention

The present invention relates to a flow rate detecting element used in a thermosensitive flow rate sensor which measures the flow rate of a fluid. The present invention also relates to an element holder which accommodates the flow rate detecting element when the flow rate detecting element is put into practical use.

The flow rate detecting element of the present invention can be used for measuring the flow rate of various fluids such as gases and/or liquids, preferably gases, and particularly air and/or a mixture of gases. The flow rate detecting element of the present invention can be preferably used for measuring the flow rate of, in particular, the air intake into an internal combustion engine.

2. Description of the Related Art

The applicant of this patent application has filed an application for patent (Japanese Patent Kokai Publication No. 11-23338) related to a thermosensitive flow rate detecting element based on an operating principle similar to that of the present invention. FIG. 9(a) shows a schematic plan view of a key portion in a basic embodiment of the invention of the above Japanese Patent Kokai Publication, and FIG. 9(b) shows a schematic sectional view taken along lines IXB—IXB in FIG. 9(a).

In FIG. 9, reference numeral 31 denotes a flat substrate made of a silicon semiconductor, 32 denotes an insulating support film made of silicon nitride, 34, 35, 36 and 37 denote thermosensitive resistors made of, for example, platinum, where 34 is a heating resistance section, 35 and 36 are temperature detecting resistance sections and 37 is a comparative resistance section, and 33 denotes an insulating protective film made of silicon nitride.

As shown in FIG. 9(b), the flat substrate 31 has a recess 38 in the right-hand portion thereof, formed by removing a part of the substrate in a predetermined size and shape by etching or other method. The flat substrate 31 also has a notch 39 in the left-hand portion thereof, formed by removing a part of the substrate in a predetermined size and shape by etching or other method, so that the notch 39 having a cross section of substantially triangular shape with the base thereof lying at the lower surface of the substrate 31 does not reach the upper surface of the substrate 31. The terms "lower surface" and "upper surface" are used herein in correspondence to the lower and upper positions in the drawings which show the longitudinal sectional view of the flow rate detecting element of the present invention, for the convenience of description.

On the upper surface of the flat substrate 31, the support film 32 and the protective film 33 are sequentially laminated. Provided between the support film 32 and the protective film 33 are the heating resistance section 34, the temperature detecting resistance sections 35, 36, and the comparative resistance section 37 being formed in predetermined patterns as shown in FIG. 9(a). A portion enclosed by two-dot and a dash line in FIG. 9(a), which includes the heating resistance section 34 and the temperature detecting resistance sections 35, 36 that are provided on both sides of the heating resistance section 34, constitutes a heating resistance region section 40. The heating resistance region 40 consists of a thin film comprising the support film 32 and the protective film 33 placed one on another, and constitutes a so-called diaphragm structure with the recess 38 formed on the bottom side so as not to contact the flat substrate 31.

Formed in the flat substrate 31 on the lower surface side of the comparative resistance section 37 is the notch 39 which opens only on the lower surface of the flat substrate 31. A portion of the flat substrate 31 remains on the side which is in contact with the support film 32.

In use condition of the flow rate detecting element having the constitution described above, the resistance sections 34, 35, 36 and 37 are connected to circuits not shown. When a fluid, for example air, flows in the direction indicated by arrow 50, the comparative resistance section 37 contacts with the flowing air via the protective film 33 to sense the temperature of the air. The temperature of the heating resistance section 34 is set to remain higher than the temperature being measured at the comparative resistance section 37 by a predetermined margin. For the application to an internal combustion engine of automobile, for example, temperature of the heating resistance section 34 is controlled to maintain a level 200 degree centigrade higher than the temperature being measured at the comparative resistance section 37.

Heat generated by the heating resistance section 34 is transmitted to the temperature detecting resistance sections 35, 36 via the support film 32 and the protective film 33. Since the temperature detecting resistance section 35 and the temperature detecting resistance section 36 are disposed at positions symmetrical with respect to the heating resistance section 34 which is located at the center as shown in FIG. 9, there is no difference in the resistance between the temperature detecting resistance section 35 and the temperature detecting resistance section 36 when there is no fluid flow. Also since the comparative resistance section 37 is located at a predetermined distance from the heating resistance section 34, heat generated by the heating resistance section 34 is substantially not transmitted to the comparative resistance section 37, so that the temperature of the comparative resistance section 37 is nearly equal to the temperature of the surrounding fluid, for example air.

When a fluid, for example air, flows in the direction indicated by the arrow 50 over the flow rate detecting element having such a constitution as described above, since the temperature of the heating resistance section 34 is set to a level generally higher than the fluid temperature to be measured, the temperature detecting resistance section 35 located in the upstream is cooled by the fluid to a lower its temperature. The temperature detecting resistance section 36 located in the downstream, on the other hand, receives the heat generated by the heating resistance section 34 and conveyed by the fluid, and therefore shows either a less drop in the temperature or a rise in the temperature. As a result, when the fluid flows in the direction indicated by the arrow 50, temperature of the temperature detecting resistance section 35 located in the upstream becomes lower than that of the temperature detecting resistance section 36 located in the downstream, while the difference in the resistance between the two temperature detecting resistance sections 35 and 36 becomes larger as the flow rate or the velocity of the fluid increases. Thus the flow rate or the velocity of the fluid can be measured by sensing the difference in the resistance between the temperature detecting resistance section 35 and the temperature detecting resistance section 36.

When the fluid flows in a direction opposite to the arrow 50, since the temperature of the temperature detecting resistance section 36 located in the upstream becomes lower than that of the temperature detecting resistance section 35 located in the downstream, contrary to the case described above, direction of the fluid flow can also be determined.

The thermosensitive flow rate detecting element as described above is accommodated in an element holder when it is practically used, in order to avoid the turbulence of the fluid flow and to achieve an effective contact of the fluid with the heating resistance section or the comparative resistance section. The applicant of this patent application has also filed an application for patent (Japanese Patent Kokai Publication No. 10-293052) on the element holder.

The flow rate detecting element described above measures flow rate by means of the heat transmission phenomenon of the fluid. Therefore, an accurate monitoring of the fluid temperature is required in order to measure the flow rate accurately. That is, when the fluid temperature varies, the comparative resistance section 37 provided on the substrate is required to detect the change without delay. When measuring an amount of the flow rate of air intake into an internal combustion engine, for example, there may be such occasions while running as the intake air temperature indicates a sudden change at, for example, the entry and exit of a tunnel. To have the internal combustion engine operate with the best performance even in such cases, the air temperature change must be detected quickly and accurately. Consequently, the flow rate detecting element is required to have good response characteristics with respect to the intake air temperature.

Silicon has a relatively large thermal capacity. As a result, in case the substrate 31 made of silicon is provided under the comparative resistance section 37, the comparative resistance section 37 has greater apparent thermal capacity which results in a limitation to the improvement of the response characteristics of the flow rate detecting element with respect to the fluid temperature changes.

SUMMARY OF THE INVENTION

With the background described above, such an attempt has been made that introduces the diaphragm structure for the comparative resistance section 37 similarly to the heating resistance region 40. However, the comparative resistance section 37 is required to have even better temperature response characteristic which means that the time required to detect the fluid temperature change is desired to be as short as possible. Thus the comparative resistance section 37 is required to have even better temperature response characteristic even when the diaphragm structure is employed.

First object of the invention of the present application is to provide a flow rate detecting element having a comparative resistance section made in such a structure that has an improved temperature response characteristic, by placing emphasis particularly on the temperature response characteristic of the comparative resistance section in the thermosensitive flow rate detecting element described above.

Second object of the invention of the present application is to provide an element holder which accommodates the thermosensitive flow rate detecting element having the comparative resistance section made in such a structure that has an improved temperature response characteristic, when put in practical use.

The flow rate detecting element according to the first aspect of the present invention has a thin film layer comprising a support film and a protective film which are made of insulating material and are formed on one surface of a flat substrate, where a heating resistance section and a comparative resistance section are provided by disposing thermosensitive resistor in predetermined patterns between the support film and the protective film of the thin film layer, and the flat substrate has a recess which penetrates the flat substrate in the direction of thickness thereof in at least a part thereof that faces the heating resistance section and the comparative resistance section, so that the thermosensitive flow rate detecting element measures the flow rate or velocity of a fluid by means of the heating resistance section according to the report of fluid temperature sensed by the comparative resistance section, while a fluid flow passage is provided which communicates with the recess that faces the comparative resistance section thereby to cause the fluid to flow to the recess.

The flow rate detecting element constituted as described above makes it possible to bring the fluid into sufficient contact also with the lower surface of the comparative resistance section having the diaphragm structure, by the fluid flow passage communicating with the recess that faces the comparative resistance section and flowing the fluid smoothly through the fluid flow passage into the recess. Thus since the comparative resistance section of the flow rate detecting element can make contact with the fluid on both the upper surface and the lower surface thereof and the fluid which contacts the lower surface also flows quickly through the fluid flow passage, the fluid temperature can be sensed sensitively. As a result, the flow rate detecting element can make quick response to the temperature change even when the fluid temperature changes suddenly.

The flow rate detecting element according to the second aspect of the present application is a variation of the flow rate detecting element of the first aspect, wherein at least two fluid flow passages are provided.

In the flow rate detecting element constituted as described above, the fluid can be caused to flow more smoothly into the recess by arranging at least one of the fluid flow passages at an fluid inlet-side of the recess and at least one of the fluid flow passages at an fluid outlet-side of the recess. Therefore, the comparative resistance section of the flow rate detecting element can sense the fluid temperature accurately, and the flow rate detecting element can make quick response to the temperature change even when the fluid temperature changes suddenly.

The flow rate detecting element according to the third aspect of the present application is a variation of the flow rate detecting element of the first aspect, wherein at least one fluid flow passage is provided in the upstream of the comparative resistance section in the main flow direction of the fluid to be measured.

In the flow rate detecting element constituted as described above, the fluid is made easier to flow through the fluid flow passage into the recess so that the fluid can flow more smoothly into the recess by providing at least one fluid flow passage in the upstream of the comparative resistance section in the main flow direction of the fluid to be measured. Therefore, the comparative resistance section of the flow rate detecting element can sense the fluid temperature sensitively, and the flow rate detecting element can make quick response to the temperature change even when the fluid temperature changes suddenly.

The flow rate detecting element according to the fourth aspect of the present application is a variation of the flow rate detecting element of the first aspect, wherein at least one fluid flow passage is provided in the downstream of the comparative resistance section in the main flow direction of the fluid to be measured.

In the flow rate detecting element constituted as described above, the fluid is made easier to flow through the fluid flow passage into the recess so that the fluid can flow more smoothly into the recess, by providing at least one fluid flow passage in the downstream of the comparative resistance section in the main flow direction of the fluid to be measured. Therefore, the comparative resistance section of the flow rate detecting element can sense the fluid temperature sensitively, and the flow rate detecting element can make quick response to the temperature change even when the fluid temperature changes suddenly.

The flow rate detecting element according to the fifth aspect of the present invention is a variation of the flow rate detecting element of the first aspect, wherein the comparative resistance section and the heating resistance section are disposed on a line which crosses the direction of the main flow direction of the fluid to be measured.

In the flow rate detecting element constituted as described above, the comparative resistance section and the heating resistance section are disposed on the line which crosses the direction of the main flow of the fluid to be measured. Accordingly, the fluid can be prevented from making contact with the heating resistance section after making contact with the comparative resistance section or from making contact with the comparative resistance section after making contact with the heating resistance section, thereby preventing the comparative resistance section and the heating resistance section from giving thermal influence to each other. As a result, the comparative resistance section of the flow rate detecting element can sense the fluid temperature more accurately without being affected by the heating resistance section. Also the heating resistance section can sense the temperature change due to the interaction with the fluid more accurately without being affected by the comparative resistance section.

The flow rate detecting element according to the sixth aspect of the present application is a variation of the flow rate detecting element of the first aspect, wherein the comparative resistance section and the heating resistance section are disposed on a line which crosses the direction of the main flow of the fluid to be measured at right angles.

In the flow rate detecting element constituted as described above, the comparative resistance section and the heating resistance section are disposed on the line which crosses the direction of the main flow of the fluid to be measured at right angles. Accordingly, the fluid can be prevented from making contact with the heating resistance section after making contact with the comparative resistance section or from making contact with the comparative resistance section after making contact with the heating resistance section, thereby preventing the comparative resistance section and the heating resistance section from giving thermal influence to each other. As a result, the comparative resistance section of the flow rate detecting element can sense the fluid temperature more accurately without being affected by the heating resistance section. Also the heating resistance section can sense the temperature change due to the interaction with the fluid without being affected by the comparative resistance section.

The seventh aspect of the present invention provides a thermosensitive flow rate detecting element which has a thin film layer comprising a support film and a protective film, both made of insulating material and formed on one surface of a flat substrate, where a heating resistance section and a comparative resistance section are provided by disposing thermosensitive resistor in predetermined patterns between the support film and the protective film of the thin film layer, and the flat substrate has a recess which penetrates the flat substrate in the direction of thickness thereof provided in at least portions thereof that face the heating resistance section and the comparative resistance section, so that the thermosensitive flow rate detecting element measures the flow rate or velocity of a fluid by means of the heating resistance section according to the report of fluid temperature sensed by the comparative resistance section, while at least two fluid flow passages are provided which communicates with the recess that faces the comparative resistance section to cause the fluid to flow to the recess, with the fluid flow passage being of one type selected from among the group consisting of:

(i) a hole which penetrates the thin film layer in the direction of thickness thereof to flow the fluid across the thin film layer between the upper surface and the lower surface thereof;

(ii) at least one groove which communicate between a recess wall surface facing the comparative resistance section and one end wall surface of the substrate on the surface of the substrate opposite to the thin film layer; and (iii) at least one tubular passage which communicates between the recess wall surface facing the comparative resistance section and one end wall surface of the substrate.

In the flow rate detecting element constituted as described above, as the first feature, the fluid can be caused to flow more smoothly into the recess by providing at least two fluid flow passages which communicate the recess facing the comparative resistance section to flow the fluid to the recess, while arranging at least one of the fluid flow passages at an fluid inlet-side of the recess and at least one of the fluid flow passages at an fluid outlet-side of the recess. Therefore, the comparative resistance section of the flow rate detecting element can sense the fluid temperature accurately, and the flow rate detecting element can make quick response to the temperature change even when the fluid temperature changes suddenly.

In the flow rate detecting element constituted as described above, as the second feature, a smooth passage can be provided for the fluid to flow through the fluid flow passages to the recess by using at least one type of flow passage selected from among a group of (i) hole, (ii) groove and (iii) tubular passage as the fluid flow passages.

The flow rate detecting element according to the eighth aspect of the present application is a variation of the flow rate detecting element of the seventh aspect, wherein the fluid flow passage provided in the upstream is a hole which penetrates the thin film layer in the direction of thickness thereof to let the fluid flow between the upper surface and the lower surface of the thin film layer, and the fluid flow passage provided in the downstream is a passage of at least one type selected from among a group consisting of:

(i) a hole which penetrates the thin film layer in the direction of thickness thereof to flow the fluid across the thin film layer between the upper surface and the lower surface thereof;

(ii) at least one groove which communicates between a recess wall surface facing the comparative resistance section and one end wall surface of the substrate on the surface of the substrate opposite to the thin film layer; and (iii) at least one tubular passage which communicates between a recessed wall surface facing the comparative resistance section and one end wall surface of the substrate.

In the flow rate detecting element constituted as described above, since the hole is used as the fluid flow passage provided in the upstream and a flow passage of at least one type selected from hole, groove and tubular passage is used as the fluid flow passage provided in the downstream, the fluid can flow through the hole located in the upstream into the recess and flow out of the recess through the fluid flow passage of at least one type selected from hole, groove and tubular passage, thus securing a smooth passage for the fluid to flow into the recess. As a result, the comparative resistance section has an improved temperature response characteristic as the fluid can flow sufficiently also to the lower surface of the comparative resistance section.

The flow rate detecting element according to the ninth aspect of the present application is a variation of the flow rate detecting element of the eighth aspect, wherein a fluid flow passage having a form of slit is provided in the upstream and the thin film layer is warped, at least in a part of the comparative resistance section, so as to be convex to the opposite side of the substrate.

In the flow rate detecting element constituted as described above, since the thin film layer is warped, at least in a part of the comparative resistance section, so as to be convex to the opposite side of the substrate, the fluid can flow more smoothly through the hole into the recess. As a result, the comparative resistance section has an improved temperature response characteristic since the fluid can flow more efficiently to the lower surface of the comparative resistance section.

The flow rate detecting element according to the tenth aspect of the present application is a variation of the flow rate detecting element of the ninth aspect, wherein a fluid flow passage having a form of slit is provided in the downstream.

In the flow rate detecting element constituted as described above, since both fluid flow passages disposed in the upstream and the downstream are formed in slits and the thin film layer is warped, at least in a part of the comparative resistance section, so as to be convex to the opposite side of the substrate, the fluid can flow more smoothly through the slit into the recess. As a result, the comparative resistance section has an improved temperature response characteristic since the fluid can flow more efficiently to the lower surface of the comparative resistance section.

The flow rate detecting element according to the eleventh aspect of the present application is a variation of the flow rate detecting element of the seventh aspect, wherein at least one groove which communicates between the recess wall surface facing the comparative resistance section and one end wall surface of the substrate is provided on the surface of the substrate opposite to the thin film surface, as the fluid flow passage in the upstream, and the fluid flow passage provided in the downstream is a passage of at least one type selected from among a group consisting of:

(i) a hole which penetrates the thin film layer in the direction of thickness thereof to flow the fluid across the thin film layer between the upper surface and the lower surface thereof;

(ii) at least one groove which communicates between a recess wall surface facing the comparative resistance section and one end wall surface of the substrate on the surface of the substrate opposite to the thin film layer; and (iii) at least one tubular passage which communicates between a recess wall surface facing the comparative resistance section and one end wall surface of the substrate.

In the flow rate detecting element constituted as described above, since the groove is used as the fluid flow passage provided in the upstream and a passage of at least one type selected from hole, groove and tubular passage is used as the fluid flow passage provided in the downstream, the fluid can flow through the groove located upstream into the recess and flow out of the recess through the fluid flow passage of at least one type selected from hole, groove and tubular passage located in the downstream, thus securing a smooth passage for the fluid to flow into the recess. As a result, the comparative resistance section has an improved temperature response characteristic since the fluid can flow sufficiently also to the lower surface of the comparative resistance section.

The flow rate detecting element according to the twelfth aspect of the present invention is a variation of the flow rate detecting element of the eleventh aspect, wherein the groove as the fluid flow passage is formed so that the sectional area thereof at the opening in the recess wall surface facing the comparative resistance section or in the end wall surface of the substrate is larger than the sectional area of any other portion of the groove.

In the flow rate detecting element constituted as described above, since the sectional area thereof at the opening in the recess wall surface facing the comparative resistance section or in the end wall surface of the substrate is larger than the sectional area of any other portion of the groove, the fluid is made easier to flow into the groove and flow out of the groove. As a result, the comparative resistance section has an improved temperature response characteristic since the fluid can flow also to the lower surface of the comparative resistance section more smoothly.

The flow rate detecting element according to the thirteenth aspect of the present invention is a variation of the flow rate detecting element of the seventh aspect, wherein at least one tubular passage which communicates between the recess wall surface facing the comparative resistance section and one end wall surface of the substrate is provided as the fluid flow passage in the upstream, and the fluid flow passage provided in the downstream is a passage of at least one type selected from among the group consisting of:

(i) a hole which penetrates the thin film layer in the direction of thickness thereof to flow the fluid across the thin film layer between the upper surface and the lower surface thereof;

(ii) at least one groove which communicates between a recess wall surface facing the comparative resistance section and one end wall surface of the substrate on the surface opposite to the thin film layer of the substrate; and (iii) at least one tubular passage which communicates between a recess wall surface facing the comparative resistance section and one end wall surface of the substrate.

In the flow rate detecting element constituted as described above, since the tubular passage is used as the fluid flow passage provided in the upstream and a passage of at least one type selected from hole, groove and tubular passage is used as the fluid flow passage provided in the downstream, the fluid can flow through the tubular passage located in the upstream into the recess and flow out of the recess through the fluid flow passage of at least one type selected from hole, groove and tubular passage located in the downstream, thus securing a smooth passage for the fluid to flow into the recess. As a result, the comparative resistance section has an improved temperature response characteristic since the fluid can flow sufficiently also to the lower surface of the comparative resistance section.

The invention of element holder according to the first aspect of the present application provides an element holder for accommodating a thermosensitive flow rate detecting element which comprises a flat substrate having a thin film layer that consists of a support film and a protective film both made of insulating material and laminated on one surface thereof, wherein a heating resistance section and a comparative resistance section are provided between the support film and the protective film of the thin film layer by disposing thermosensitive resistor in predetermined patterns, the flat substrate has a recess which penetrates the flat substrate in the direction of thickness thereof in at least such portions thereof that face the heating resistance section and the comparative resistance section, and a fluid flow passage which communicates with the recess facing the comparative resistance section is provided to flow the fluid to the recess, so that the thermosensitive flow rate detecting element measures the flow rate or velocity of the fluid by means of the heating resistance section according to the report of fluid temperature sensed by the comparative resistance section, the element holder having airfoil-shaped cross section with at least one gap opening provided in the holder surface in the upstream and the downstream portions with respect to the comparative resistance section.

The element holder constituted as described above causes no significant disturbance to the fluid flow around the element holder because of the airfoil-shaped cross section, and rather shows flow straightening effect so that the fluid is introduced through the gap opening in the upstream of the comparative resistance section into the holder and, after making sufficient contact with the flow rate detecting element accommodated therein, particularly with the comparative resistance section, the fluid can be discharged to the outside of the holder through the gap opening located in the downstream of the comparative resistance section. Thus the fluid can sufficiently make contact with the flow rate detecting element accommodated therein. As a result, the comparative resistance section of the flow rate detecting element can exhibit good temperature response characteristic without substantially disturbing the fluid flow.

The invention of element holder according to the second aspect of the present application is the element holder of the first aspect, wherein the gap opening located in the upstream of the comparative resistance section is provided at a position which corresponds to the upper surface of the flow rate detecting element that is accommodated therein.

The element holder constituted as described above, when used in conjunction with the flow rate detecting element which has a hole provided as the fluid flow passage in the upstream of the flow rate detecting element, the gap opening located in the upstream of the element holder and the hole provided as the fluid flow passage of the flow rate detecting element accommodated therein can be disposed so as to oppose each other. As a result, the fluid flow in the element holder and around the flow rate detecting element can be made smoother.

The invention of element holder according to the third aspect of the present application is the element holder of the first aspect, wherein the lower edge of the gap opening located in the upstream of the comparative resistance section is provided at a position which corresponds to the end wall surface of the substrate of the flow rate detecting element that is accommodated therein.

The element holder constituted as described above, when used in conjunction with the flow rate detecting element which has a tubular passage that opens in the end wall surface located in the upstream of the substrate, the gap opening located in the upstream of the element holder and the tubular passage provided as the fluid flow passage of the flow rate detecting element accommodated therein can be disposed so as to oppose each other. As a result, the fluid flow in the element holder and around the flow rate detecting element can be made smoother.

The invention of element holder according to the fourth aspect of the present application is the element holder of the first aspect, wherein the lower edge of the gap opening located in the upstream of the comparative resistance section is provided at a position the same level as or lower than the lower surface of the substrate or at a position below thereof in the flow rate detecting element that is accommodated therein.

The element holder constituted as described above, when used in conjunction with the flow rate detecting element which has a groove provided in the lower surface of the substrate as the fluid flow passage located in the upstream of the flow rate detecting element, makes it possible to dispose the gap opening located in the upstream of the element holder and the groove provided as the fluid flow passage of the flow rate detecting element accommodated therein so as to oppose each other. As a result, the fluid flow in the element holder and around the flow rate detecting element can be made smoother.

BRIEF DESCRIPTION OF THE DRAWINGS

FIGS. 1a and 1b are schematic diagrams showing a basic embodiment of the invention related to the flow rate detecting element, particularly illustrating the features of the first to fourth, ninth and twelfth embodiments, FIG. 1a being a plan view of the comparative resistance section of the flow rate detecting element and vicinity, and FIG. 1b being a sectional view taken along lines Ib—Ib in FIG. 1a.

FIGS. 2a–2c are schematic diagrams showing a basic embodiment of the invention related to the flow rate detecting element, particularly illustrating the features of the thirteenth and fourteenth embodiments, FIG. 2a being a plan view of the comparative resistance section of the flow rate detecting element and vicinity, FIG. 2b being a sectional view taken along lines IIb—IIb in FIG. 2a and FIG. 2c being a sectional view taken along lines IIc—IIc in FIG. 2a.

FIGS. 3a–3c are schematic diagrams showing a basic embodiment of the invention related to the flow rate detecting element, particularly illustrating the features of the first to fourth and fifteenth embodiments, FIG. 3a being a plan view of the comparative resistance section of the flow rate detecting element and vicinity, FIG. 3b being a sectional view taken along lines IIIb—IIIb in FIG. 3a, and FIG. 3c being an end view from the right-hand side in FIG. 3a.

FIGS. 4a–4c are schematic diagrams showing a basic embodiment of the invention related to the flow rate detecting element, particularly illustrating the features of the first to fourth, ninth and fifteenth embodiments, FIG. 4a being a plan view of the comparative resistance section of the flow rate detecting element and vicinity, FIG. 4b being a sectional view taken along lines IVb—IVb in FIG. 4a, and FIG. 4c being an end view from the right-hand side in FIG. 4a.

FIGS. 5a–5c are schematic diagrams showing a basic embodiment of the invention related to the flow rate detecting element, particularly illustrating the features of the first to fourth, ninth and sixteenth embodiments, FIG. 5a being a plan view of the comparative resistance section of the flow rate detecting element and vicinity, FIG. 5b being a sectional view along line Vb—Vb in FIG. 5a, and FIG. 5c being an end view from the right-hand side in FIG. 5a.

FIGS. 6a and 6b are schematic diagrams showing a basic embodiment of the invention related to the flow rate detecting element, particularly illustrating the features of the fourteenth embodiment, FIG. 6a being a plan view of the comparative resistance section of the flow rate detecting element and vicinity, FIG. 6b being a sectional view taken along lines VIb—VIb in FIG. 6a, and FIG. 6c being an end view from the right-hand side in FIG. 6a.

FIGS. 8a–8c are schematic diagrams showing a basic embodiment of the invention related to the element holder, particularly illustrating the features of the fourth embodiment of the element holder, FIG. 8a being a schematic plan view of the flow rate detecting element and the element holder which accommodates the flow rate detecting element being cut away by a horizontal surface at the same height as the top surface of the flow rate detecting element, FIG. 8b being a sectional view taken along lines VIIIb—VIIIb in FIG. 8a, and FIG. 8c being an end view in FIG. 8a. FIG. 8a corresponds to the sectional view taken along lines VIIIa—VIIIa in FIG. 8b.

FIGS. 9a and 9b are schematic diagrams showing the basic constitution of the thermosensitive flow rate detecting element.of diaphragm type of the prior art, FIG. 9a schematically showing the flow rate detecting element accommodated in the element holder, and FIG. 9b being a sectional view taken along lines IXb—IXb in FIG. 9a.

DETAILED DESCRIPTION OF THE PREFERRED EMBODIMENTS

Figure 1A:
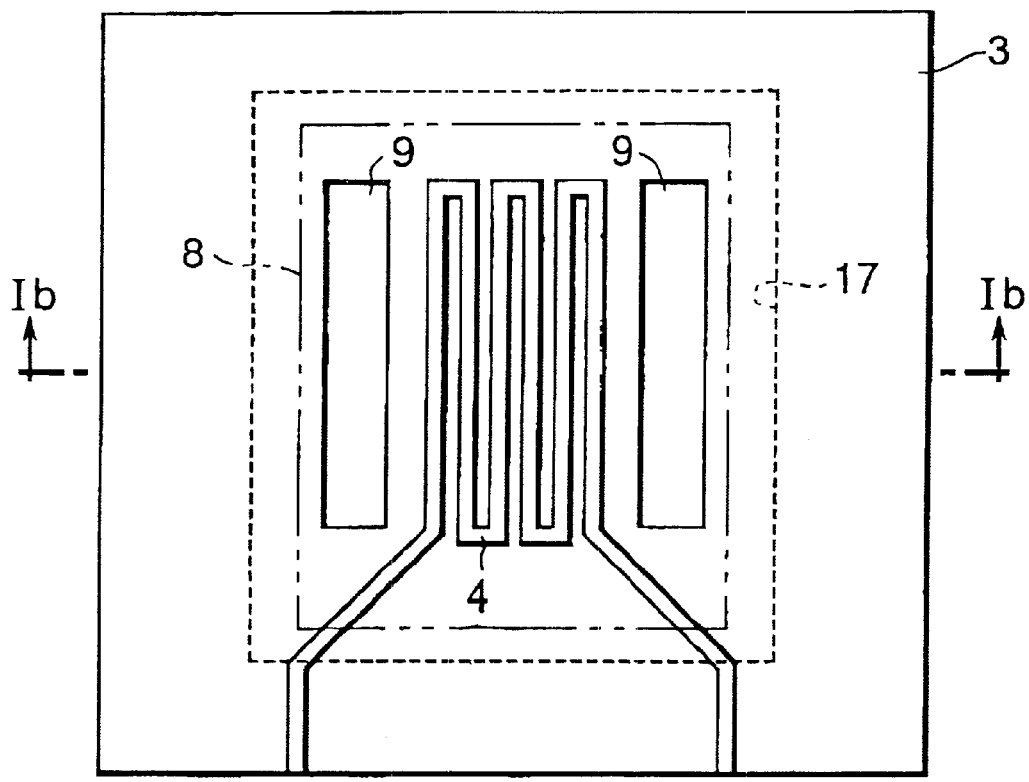

The inventions of the present application will now be described by way of preferred embodiments.

First Embodiment

The first embodiment of the invention related to the flow rate detecting element of the present application is schematically shown in FIGS. 1 to 6.

In FIG. 1, reference numeral 1 denotes a flat substrate made from, for example, a silicon wafer about 400 $\mu$m thick, with a support film 2 made of silicon nitride film about 1 $\mu$m thick being formed on the upper surface of the flat substrate 1 by sputtering or other process. Provided on the support film 2 is a thermosensitive resistor made of platinum being formed in a predetermined pattern as shown in the drawing with a thickness of, for example, 0.2 $\mu$m by such process as vapor deposition or sputtering, thereby forming a comparative resistance section 4. The comparative resistance section 4 is a current path formed by patterning with such as photomechanical process, wet etching process or dry etching process. Formed by sputtering or the like on the top surface of the support film 2 and the comparative resistance section 4 is a protective film 3 made of silicon nitride film about 1 $\mu$m thick. The layer comprising the support film 2 and the protective film 3 which sandwich the comparative resistance section 4 will be referred to as the thin film layer in this specification.

The lower surface of the flat substrate 1, namely the surface opposite to that whereon the support film 2 is formed, is covered by a back surface protecting film 5. The back surface protecting film 5 is a layer made of, for example, $SiO_2$ for the protection of the lower surface of the substrate.

Then an etching hole corresponding to the shape of the recess to be formed in the lower surface of the substrate is formed into the lower surface of the back surface protecting film 5. In the drawing, reference numeral 17 indicates the outline of the etching hole. The etching hole is formed by photoengraving or other process.

After the etching hole has been formed, the substrate 1 is partially removed by an etching process, for example alkali etching, thereby to form the recess 7, which has a predetermined shape in plan view (substantially rectangular in FIG. 1a) and penetrates the flat substrate in the direction of thickness, in the lower surface of the substrate 1. As shown in FIG. 1b, the recess 7 has a longitudinal section of substantially trapezoidal shape, expanding in width toward the lower surface of the substrate. Dimensions and shape of the recess 7 may be determined by a technique known in the prior art or may be modified as required by the design.

Figure 1B:
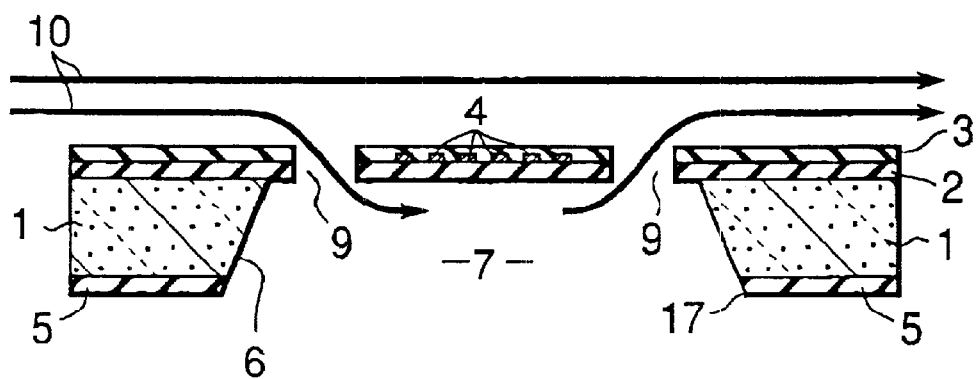

In FIG. 1a, a portion of the thin film layer which faces the recess 7 and includes the comparative resistance section 4 and an area surrounding thereof is enclosed by two-dot and a dash line in a rectangular shape, which will be referred to as the comparative resistance region 8 for the convenience of description. Since the recess 7 is formed on the lower surface of the comparative resistance region 8 of the flow rate detecting element, the thin film layer can be said to constitute a so-called diaphragm structure in the comparative resistance region 8.

The flow rate detecting element has a fluid flow passage which communicates with the recess 7 thereby to flow a fluid into the recess 7.

According to the invention related to the flow rate detecting element of the first embodiment of the present application, the fluid flow passage may have any size, shape or form as long as the basic function of communicating with the recess 7 and flowing a fluid into the recess 7 can be performed.

Figure 6A:
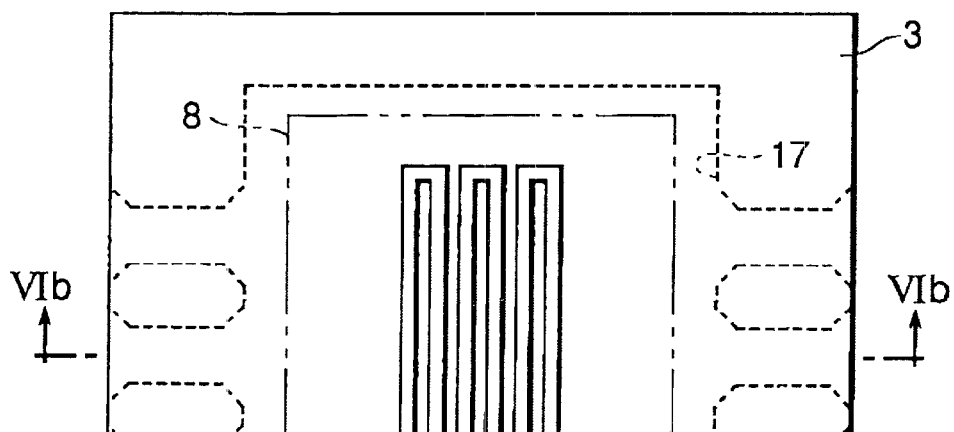
Figure 6C:
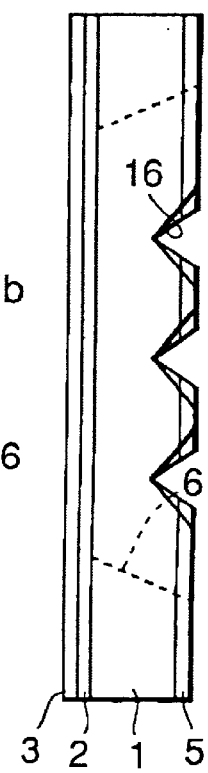
Figure 6B:
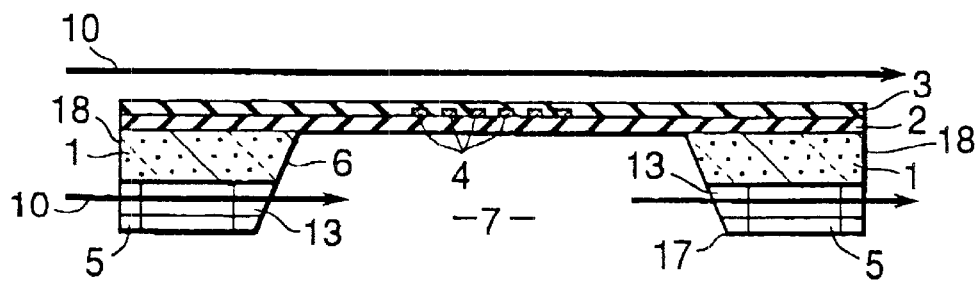

For particular forms of the fluid flow passage, the form of holes 9 which penetrate the thin film layer in the direction of thickness on both sides of the comparative resistance section as shown in FIGS. 1 and 2, the form of grooves 13, 14, 16 formed on the lower surface of the substrate as shown in FIGS. 3, 4, 6, and the form of tubular passages 15 which penetrates the substrate as shown in FIG. 5 can be shown.

The hole shown in FIG. 1 has a form of narrow rectangle (slit) extending at right angles to the direction of main flow of the fluid indicated by arrow 10 in the plan view of FIG. 1a and is, as shown in the longitudinal view of FIG. 1b, defined by two vertical walls which are formed by cutting off the thin film layer vertically so as to be substantially parallel to each other, although the present invention is not limited to this configuration. The fluid flow passage may be triangle, rectangle or other polygonal shape, rounded shape such as circle, elongated circle or oval, or a shape enclosed by a series of straight lines and/or curves in the plan view. The outline of the wall surface of the substrate appearing in the sectional view may also be constituted from straight lines inclined by various angles or various curves, or a combination thereof.

The term "direction of main flow of the fluid" used in the present invention means the direction in which the predominant velocity component of the fluid flow lies. Accordingly, the direction of main flow of the fluid is directed from the left to the right in all examples shown in FIGS. 1 to 8, even when the fluid involves local disturbance or vortex. The fluid flow is indicated by the arrow 10 in FIGS. 1 to 8.

The fluid flow passage in the form of hole or slit can be easily formed by etching the thin film layer by dry etching or the like, in the state of the thin film layer having been formed on the substrate.

In FIG. 1, the fluid is assumed to flow from the left to the right as indicated by the arrow 10 in FIG. 1*b*, and the two fluid flow passages are provided in the upstream and downstream of the comparative resistance region 8. However, there are no limitations to the number and positions of the fluid flow passages to be provided as long as the fluid can flow smoothly into the recess 7 which is provided in the lower surface of the thin film layer. Thus a case of providing a single fluid flow passage is also included in the scope of the invention related to the first embodiment, regardless of whether the fluid flow passage is installed over or below the comparative resistance section 4 in FIG. 1*a*. Direction of the fluid flow during use is also not limited to that shown in the drawing.

The flow rate detecting element constituted as described above makes it possible to bring the fluid into sufficient contact also with the lower surface of the comparative resistance region which has the diaphragm structure, by the fluid flow passage communicating with the recess that faces the comparative resistance region and flowing the fluid smoothly through the fluid flow passage into the recess. Thus since the comparative resistance section of the flow rate detecting element can make contact with the fluid on both the upper surface and the lower surface thereof and the fluid which contacts the lower surface also flows quickly through the fluid flow passage, the fluid temperature can be sensed sensitively. As a result, the flow rate detecting element can make quick response to the temperature change even when the fluid temperature changes suddenly.

Second Embodiment

The second embodiment of the invention related to the flow rate detecting element of the present application is schematically shown in FIGS. 1 to 6.

The invention related to the flow rate detecting element of the second embodiment is a variation of the flow rate detecting element of the first embodiment, wherein at least two fluid flow passages are provided.

In the example shown in FIGS. 1 and 2, fluid flow passages 9 in the form of slit are provided at two positions on both sides of the comparative resistance section 4, to the left and right. In the example shown in FIGS. 3 and 6, three grooves 13 are provided on the left side of the comparative resistance section 4 and three grooves 13 are provided also on the right side of the comparative resistance section 4, while in the example shown in FIG. 4 one wide groove 14 is provided on the left side of the comparative resistance section 4 and one wide groove 14 is provided also on the right side of the comparative resistance section 4. In the example shown in FIG. 5, three tubular passages 15 are provided on the left side of the comparative resistance section 4 and three tubular passages 15 are provided also on the right side of the comparative resistance section 4. Basic constitution of the flow rate detecting element in any of FIGS. 1 to 6 is the same as that of the first embodiment.

In the flow rate detecting element constituted as described above, the fluid can be caused to flow more smoothly into the recess by using at least one fluid flow passage as an inlet of the fluid and at least one fluid flow passage as an outlet of the fluid. Therefore, the comparative resistance section of the flow rate detecting element can sense the fluid temperature accurately, and the flow rate detecting element can make quick response to the temperature change even when the fluid temperature changes suddenly.

As to the size and shape of the fluid flow passage, many variations may be employed as in the case of the first embodiment.

Third Embodiment

The third embodiment of the invention related to the flow rate detecting element of the present application is schematically shown in FIGS. 1 to 6.

The invention related to the flow rate detecting element of the third embodiment is a variation of the flow rate detecting element of the first embodiment, wherein at least one fluid flow passage is provided in the upstream of the comparative resistance section in the main flow direction of the fluid to be measured.

In the example shown in FIGS. 1 to 6, main flow direction of the fluid to be measured is from the left to the right as indicated by the arrow 10 in the drawing. In all of the cases shown in FIGS. 1 to 6, the fluid flow passage is disposed in the upstream of the comparative resistance section 4, namely on the right side of the comparative resistance section 4. Basic constitution of the flow rate detecting element in any of FIGS. 1 to 6 is the same as that of the first embodiment.

In the flow rate detecting element constituted as described above, it is made easier for the fluid to flow through the fluid flow passage into the recess so that the fluid can be caused to flow more smoothly through the fluid flow passage into the recess, by providing at least one fluid flow passage in the upstream of the comparative resistance section in the main flow direction of the fluid to be measured. Therefore, the comparative resistance section of the flow rate detecting element can sense the fluid temperature accurately, and the flow rate detecting element can make quick response to the temperature change even when the fluid temperature changes suddenly.

Forth Embodiment

The fourth embodiment of the invention related to the flow rate detecting element of the present application is schematically shown in FIGS. 1 to 6.

The invention related to the flow rate detecting element of the fourth embodiment is a variation of the flow rate detecting element of the first embodiment, wherein at least one fluid flow passage is provided in the downstream of the comparative resistance section in the main flow direction of the fluid to be measured.

In the example shown in FIGS. 1 to 6, the main flow direction of the fluid to be measured is from the left to the right as indicated by the arrow 10 in the drawing. Thus in all of the cases shown in FIGS. 1 to 6, the fluid flow passage is provided in the downstream of the comparative resistance section 4, namely on the right side of the comparative resistance section 4. Basic constitution of the flow rate detecting element in any of FIGS. 1 to 6 is the same as that of the first embodiment.

In the flow rate detecting element constituted as described above, it is made easier for the fluid to flow through the fluid flow passage into the recess so that the fluid can be caused to flow more smoothly into the recess, by providing at least one fluid flow passage in the downstream of the comparative resistance section in the main flow direction of the fluid to be measured. Therefore, the comparative resistance section of the flow rate detecting element can sense the fluid temperature accurately, and the flow rate detecting element can make quick response to the temperature change even when the fluid temperature changes suddenly.

Fifth Embodiment

The fifth embodiment of the invention related to the flow rate detecting element of the present application is schematically shown in FIGS. 7 and 8.

The invention related to the flow rate detecting element of the fifth embodiment is a variation of the flow rate detecting element of the first embodiment, wherein the comparative resistance section and the heating resistance section are disposed on a line which crosses the direction of the main flow direction of the fluid to be measured.

In the example shown in FIGS. 7 and 8, the fluid flow passages are provided on both sides of the comparative resistance section 25, and the main flow direction of the fluid to be measured is from the left to the right as indicated by the arrow 10 in the drawing.

Figure 8A:
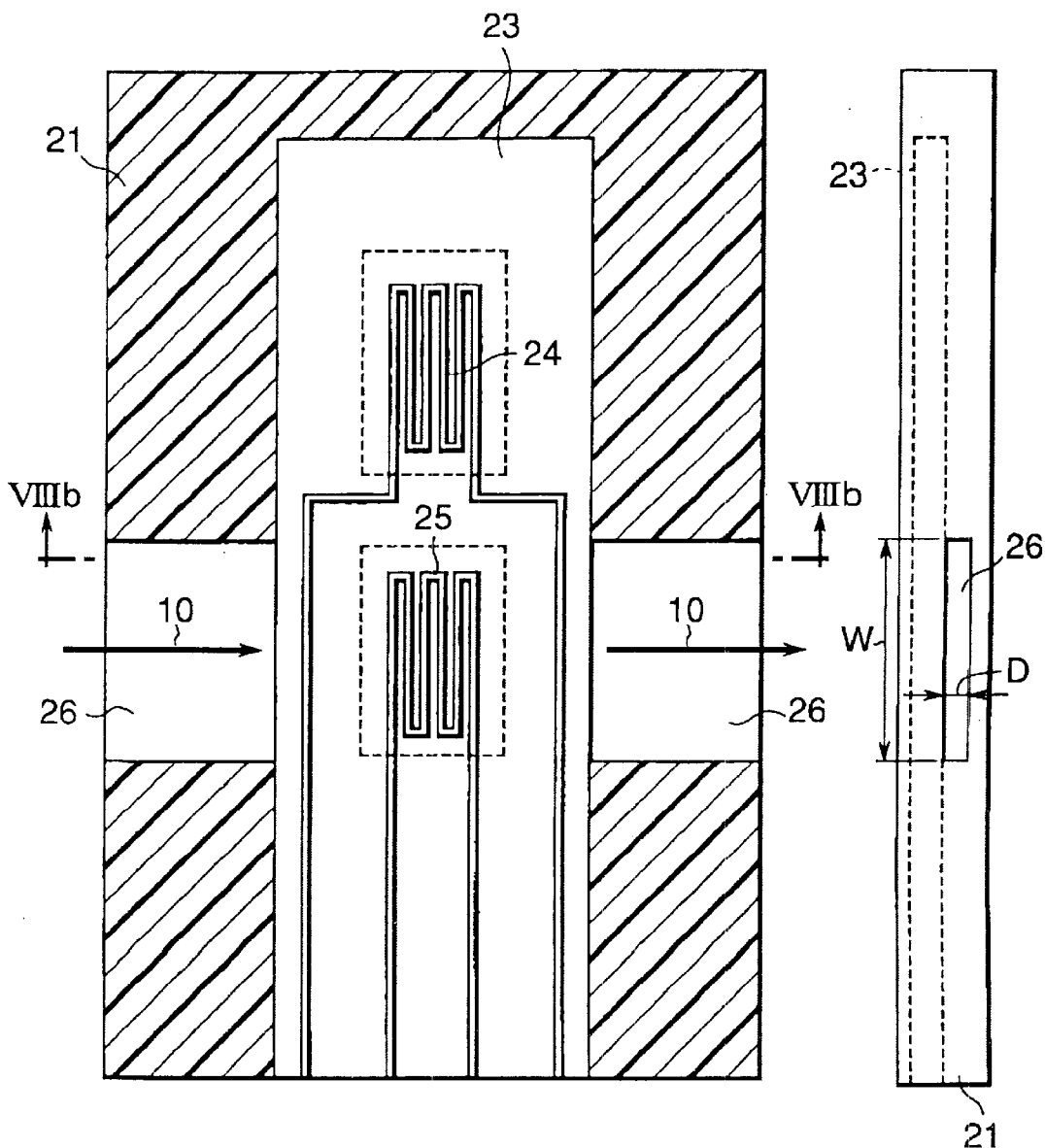
Figure 8C:
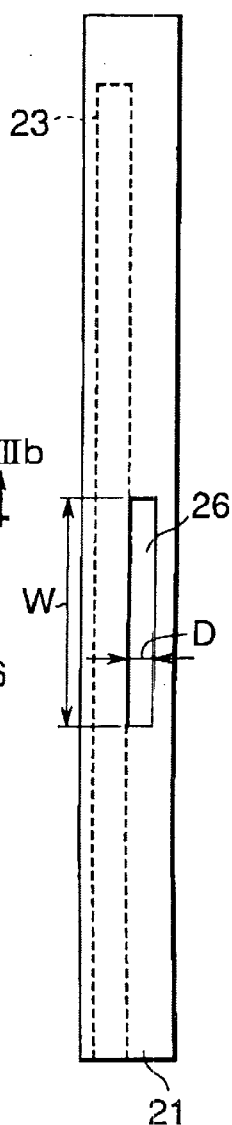
Figure 8B:
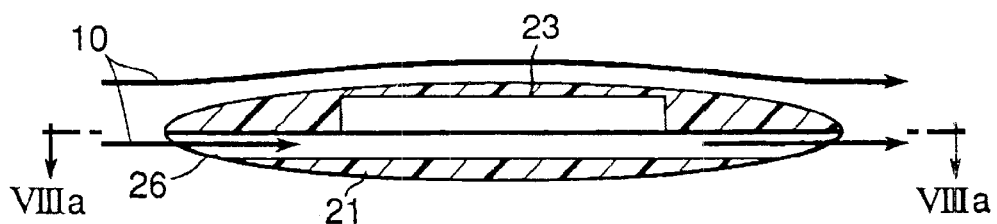
Figure 9A:
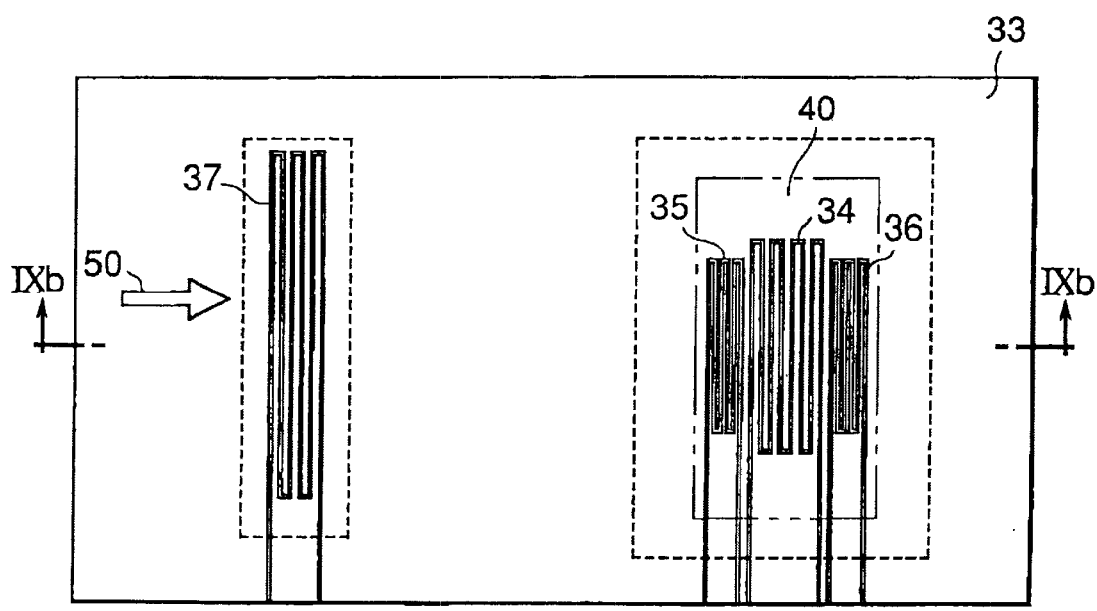
Figure 9B:
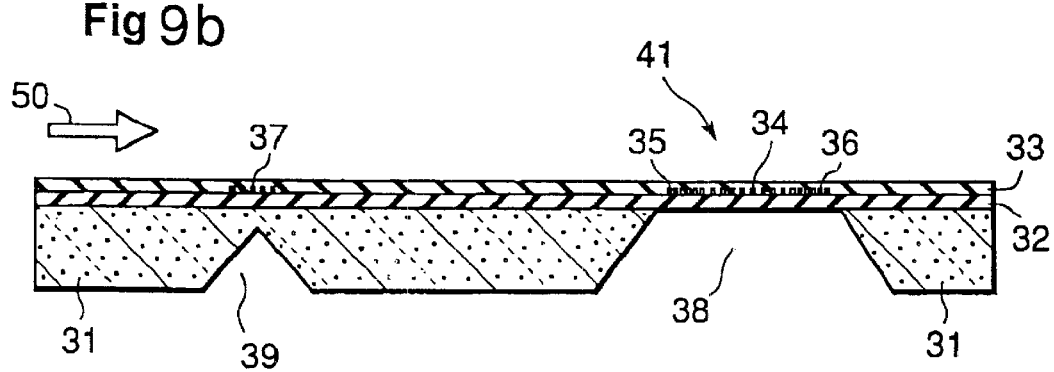

In the flow rate detecting element 23 shown in FIGS. 7 and 8, since the fluid flow passages are provided so as to bring the fluid into good contact with the upper and lower surfaces of the comparative resistance section 25 the heating resistance section cannot be provided in the downstream of the comparative resistance section as in the case shown in FIG. 9, in order to prevent the heating resistance section from being thermally influenced by the comparative resistance section. Therefore, when the flow rate detecting element of this invention is used, arrangement of the comparative resistance section and the heating resistance section should be determined so that the heating resistance section is free from the thermal influence of the comparative resistance section or is least likely to be influenced thereby.

For this reason, the comparative resistance section 25 and the heating resistance section 24 in the example shown in FIG. 7 are disposed on a line which crosses the direction of the main flow of the fluid to be measured. The example shown in FIG. 8 is also constituted similarly.

The line which crosses the direction of the main flow of the fluid, mentioned above, may be any line except for the line which is parallel to the main flow direction of the fluid. Therefore, all embodiments except for one wherein the comparative resistance section and the heating resistance section are disposed on a line parallel to the direction of the main flow of the fluid to be measured are included in the scope of this invention. Thus the scope of this invention includes not only such an arrangement where the comparative resistance section and the heating resistance section are disposed on a line, which crosses the direction of the main flow of the fluid to be measured, on the same surface of one flat substrate, but also such an arrangement where two or more flat substrates are laminated with proper space therebetween with the comparative resistance section being provided on the surface of one substrate and the heating resistance section being provided on the surface of a substrate above or below the former.

In the flow rate detecting element constituted as described above, the comparative resistance section and the heating resistance section are disposed on the line which crosses the direction of the main flow of the fluid to be measured. Accordingly, the fluid can be prevented from making contact with the heating resistance section after making contact with the comparative resistance section or from making contact with the comparative resistance section after making contact with the heating resistance section, thereby preventing the comparative resistance section and the heating resistance section from giving thermal influence to each other. As a result, the comparative resistance section of the flow rate detecting element can sense the fluid temperature more accurately without being affected by the heating resistance section. Also the heating resistance section can sense the temperature change due to the interaction with the fluid more accurately without being affected by the comparative resistance section.

Sixth Embodiment

The sixth embodiment of the invention related to the flow rate detecting element of the present application is schematically shown in FIGS. 7 and 8.

The invention related to the flow rate detecting element of the sixth embodiment is a variation of the flow rate detecting element of the first embodiment, wherein the comparative resistance section and the heating resistance section are disposed on a line which perpendicularly crosses the direction of the main flow of the fluid to be measured.

In the example shown in FIGS. 7 and 8, the fluid flow passages are provided on both sides of the comparative resistance section 25, to the left and right, and the main flow direction of the fluid to be measured is from the left to the right as indicated by the arrow 10 in the drawing.

In this embodiment, too, the heating resistance section cannot be provided in the downstream of the comparative resistance section as in the case shown in FIG. 9, for the same reason as that of the fifth embodiment. Therefore, when the flow rate detecting element of this invention is used, arrangement of the comparative resistance section and the heating resistance section should be determined so that the heating resistance section is free from the thermal influence of the comparative resistance section or is least likely to be influenced thereby.

For this reason, the comparative resistance section 25 and the heating resistance section 24 in the example shown in FIG. 7 are disposed on a line which perpendicularly crosses the direction of the main flow of the fluid to be measured. The example shown in FIG. 8 is also constituted similarly.

In the flow rate detecting element constituted as described above, the comparative resistance section and the heating resistance section are disposed on the line which perpendicularly crosses the direction of the main flow of the fluid to be measured. Accordingly, the fluid can be prevented from making contact with the heating resistance section after making contact with the comparative resistance section or from making contact with the comparative resistance section after making contact with the heating resistance section, thereby preventing the comparative resistance section and the heating resistance section from giving thermal influence to each other. As a result, the comparative resistance section of the flow rate detecting element can sense the fluid temperature more accurately without being affected by the heating resistance section. Also the heating resistance section can sense the temperature change due to the interaction with the fluid without being affected by the comparative resistance section.

Seventh Embodiment

The seventh embodiment of the invention related to the flow rate detecting element of the present application is schematically shown in FIGS. 1 to 6.

The invention related to the flow rate detecting element of the seventh embodiment has such a constitution as, at least two fluid flow passages are provided which communicate with the recess that faces the comparative resistance section so as to cause the fluid to flow to the recess, with the fluid flow passage being of one type selected from among the group consisting of:

(i) a hole which penetrates the thin film layer in the direction of thickness thereof to flow the fluid across the thin film layer between the upper surface and the lower surface thereof;

(ii) at least one groove which communicates between a recess wall surface facing the comparative resistance section and one end wall surface of the substrate on the surface of the substrate opposite to the thin film layer; and (iii) at least one tubular passage which communicates between a recess wall surface facing the comparative resistance section and one end wall surface of the substrate.

In the example shown in FIGS. 1 and 2, the fluid flow passages in the form of slit holes 9 are provided at two positions on both sides of the comparative resistance section 4, to the left and right thereof. In the example shown in FIGS. 3 and 6, the fluid flow passages in the forms of three grooves 13, 16 are provided on each side of the comparative resistance section 4, to the left and right thereof. In the example shown in FIG. 4, the fluid flow passage in the form of one wide groove 14 is provided on each side of the comparative resistance section 4. In the example shown in FIG. 5, the fluid flow passages in the form of three tubular passages 15 are provided on each side of the comparative resistance section 4, to the left and right thereof. Basic constitution of the flow rate detecting element in any of FIGS. 1 to 6 is the same as that of the first embodiment.

(i) Although the hole which penetrates the thin film layer in the direction of thickness and causes the fluid to flow between the upper surface and the lower surface of the thin film layer is provided in an inner region of the comparative resistance region 8 in the example shown in FIG. 1, the hole may also be provided on the outside of the comparative resistance region 8, in the portion where the substrate 1 exists on the lower surface of the thin film layer, as long as the function to flow the fluid between the upper surface and the lower surface of the thin film layer can be performed.

The shapes of the hole in the plan view and in the longitudinal sectional view thereof are not limited to those shown in the drawing, as mentioned in conjunction with the first embodiment. The fluid flow passage may be formed in triangle, rectangle or other polygonal shape, rounded shape such as circle, elongated circle or oval, or a shape enclosed by a series of straight lines and/or curves in the plan view. The outline of the wall surface of the substrate appearing in the sectional view may also be constituted from straight lines inclined by various angles or various curves, or a combination thereof.

(ii) At least one groove which communicates between the recess wall surface that faces the comparative resistance section and one end wall surface of the substrate on the surface of the substrate opposite to the thin film layer has a substantially triangular cross section at the opening of the groove 13 as shown in FIG. 3c, in the example shown in FIG. 3, the groove 13 which has substantially triangular cross section extends so as to communicate between the recess wall surface 6 that faces the comparative resistance section and one end wall surface 18 of the substrate. In the example shown in FIG. 4, the groove 14 has substantially trapezoidal cross section at the opening of the groove as shown in FIG. 4c, so that the groove 14 having substantially trapezoidal cross section extends so as to communicate between the recess wall surface 6 that faces the comparative resistance section and one end wall surface 18 of the substrate. In the example shown in FIG. 6, although the overall shape of the groove is similar to that of the example shown in FIG. 3, sectional area of the groove 16 at the opening in the recess wall surface 6 facing the comparative resistance section or in the end wall surface 18 of the substrate is made larger than the sectional area of any other portion of the groove 16. Thus in the flow rate detecting element of the seventh embodiment, the fluid can flow smoothly through the groove in case the recess wall surface 6 which faces the comparative resistance section and one end wall surface 18 of the substrate are communicated with each other by the groove.

While the groove has the opening formed in triangular or rectangular cross section and has a straight outline extending straight in the plan view in the examples shown in these drawings, this invention is not limited to this configuration and the opening of the groove may have cross section of various shapes similarly to the case of the hole in plan view. The outline of the groove in plan view may also have a shape constituted from a combination of one or more straight line and/or curve in the plan view.

(iii) At least one tubular passage which communicates between the recess wall surface that faces the comparative resistance section and one end wall surface of the substrate is illustrated by the example shown in FIG. 5, which means a fluid flow passage 15 that penetrates the substrate 1 like a tube, with one end thereof opening in the recess wall 6 of the substrate that surrounds the recess and the other end opening in one end wall surface 18 of the substrate 1. While the opening of the tubular passage has rectangular cross section and has a straight outline extending straight in the plan view in the examples shown in FIG. 5, this invention is not limited to this configuration and the opening of the tubular passage may have cross section of various shapes similarly to the case of the hole in plan view. The outline of the tubular passage in plan view may also have a shape constituted from a combination of one or more straight line and/or curve in the plan view. Thus in the flow rate detecting element of the seventh embodiment, the fluid can be caused to flow smoothly through the tubular passage, since the tubular passage communicates between the recess wall surface 6 and the end wall surface 18 of the substrate.

Such a tubular passage can be formed in a silicon substrate by employing a technique called the electrochemical etching. The technique of electrochemical etching is described in detail by H. Ohji, P. T. J. Gennisen, P. J. French and K. Tsutumi in "FABRICATION OF ACCELEROMETER USING SINGLE-STEP ELECTROCHEMICAL ETCHING FOR MICRO STRUCTURES (SEEM)" (IEEE MEMS Workshop 1999, Orlando, USA, pp61–65), the contents of which is incorporated by reference herein.

Specific process of forming the tubular passage will be described below with reference to FIGS. 10a, b, c, and d. Forming of the thin film layer on the upper surface of the flat substrate 1 and covering of the lower surface of the substrate 1 with the back surface protecting film 5 are carried out similarly to the process described in the first embodiment.

Figure 10A:
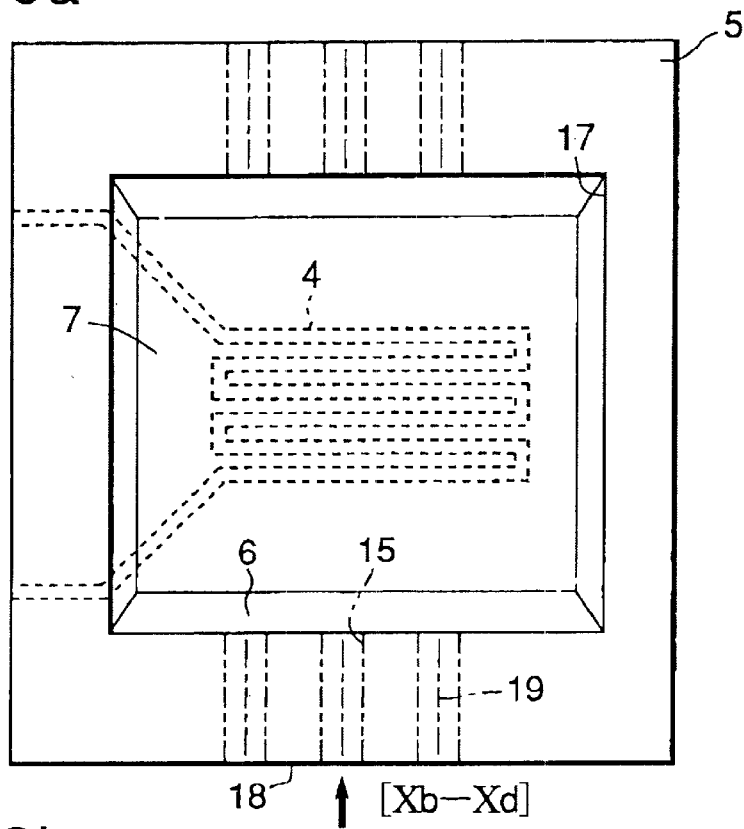
FIGS. 10a and 10b schematically show the process of forming the tubular passage which penetrates the substrate according to the invention related to the flow rate detecting element, FIG. 10a showing the lower surface of the substrate before being subjected to electrochemical etching, FIG. 10b being an end view showing a V groove a formed in the lower surface of the substrate, FIG. 10c being an end view showing a groove b and groove c being formed from the V groove a downward in the lower surface of the substrate, and FIG. 10d being an end view showing a tubular passage being formed by filling up the groove b while leaving the groove c unfilled on the lower surface of the substrate.
Figure 10B:
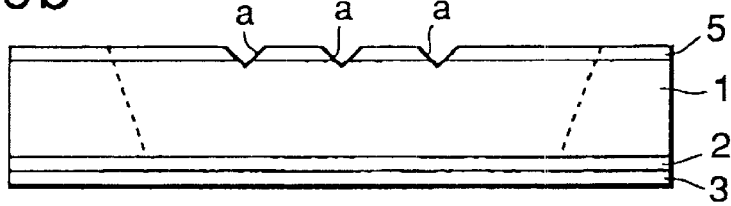
Figure 10C:
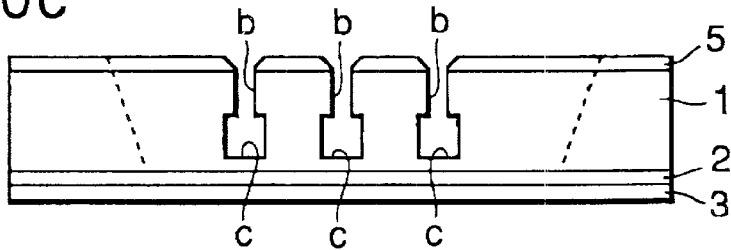
Figure 10D:
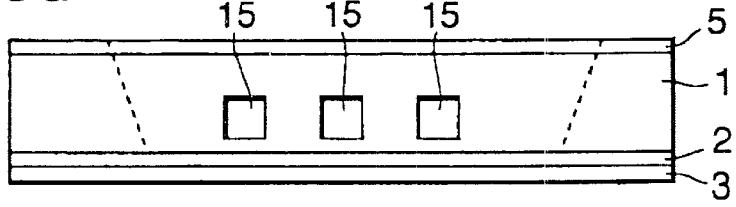

FIG. 10a is a bottom view of the substrate 1 shown in FIG. 5a before being subjected to the electrochemical etching, being rotated by 90° to the left. FIG. 10b to FIG. 10d are end views of the substrate 1 of FIG. 10a viewed in the direction of arrow [Xb-Xd]. In other words, FIG. 10b to FIG. 10d show the flat substrate 1 shown in FIG. 5 up side down. Steps of the electrochemical etching process will be described below with reference to these drawings.

First, as shown in FIG. 10a, a line 19 which becomes a reference for the planar configuration of the tubular passage 15 to be formed viewed from the back surface protecting film 5 side is drawn on the surface of the back surface protecting film 5 by photoengraving or the like. The planar configuration of the tubular passage 15 shown in FIG. 10a has a form of narrow rectangle extending between the recess wall surface 6 and the end wall surface 18, and the line 19 which makes reference far the individual tubular passage 15 is indicated by an alternate dot and dash line. Since three tubular passages 15 are to be formed between one end wall surface 18 and the recess wall surface 6 in FIG. 10a, three lines 19 corresponding thereto are formed. The substrate 1 having the lines 19 drawn thereon is subjected to alkali etching or the like, thereby to form grooves a having V-shaped longitudinal section at the positions of the lines 19 as shown in FIG. 10b. Electrochemical etching by using the V-shaped grooves a as the initial pit results in the formation of groove b which extends from the V-shaped grooves a vertically downward (in the direction of thickness of the substrate) as shown in FIG. 10c. When the grooves b have attained a predetermined depth, widths of the grooves are increased in the horizontal direction (namely in the direction of the substrate surface) by increasing the current density, thereby forming relatively wide grooves c which has rectangular cross section at the distal ends of the relatively narrow grooves b that extend vertically as shown in FIG. 10c. Then the grooves b are filled up by CVD process or the like, so that only the grooves c remain in the substrate 1 as shown in FIG. 10d. The tubular passages 15 which penetrate the substrate 1 like tube are formed in the process described above.

In the flow rate detecting element constituted as described above, as the first feature, the fluid can be caused to flow more smoothly into the recess by providing at least two fluid flow passages which communicate with the recess wall surface which faces the comparative resistance section so as to flow the fluid to the recess, while arranging at least one of the fluid flow passages at an fluid inlet-side of the recess and at least one of the fluid flow passages at an fluid outlet-side of the recess. Therefore, the comparative resistance section of the flow rate detecting element can sense the fluid temperature accurately, and the flow rate detecting element can make quick response to the temperature change even when the fluid temperature changes suddenly.

In the flow rate detecting element constituted as described above, as the second feature, a smooth passage can be provided for the fluid to flow through the fluid flow passages to the recess by using at least one type of passage selected from among a group consisting of (i) hole, (ii) groove and (iii) tubular passage as the fluid flow passages.

While it is preferable to employ the fluid flow passages of at least one type selected from among a group consisting of (i) hole, (ii) groove and (iii) tubular passage for the fluid flow passages to be formed in one substrate from the view point of the production efficiency and costs, a combination of (i) hole and/or (ii) groove and/or (iii) tubular passage may be employed as required. Specifically, such a constitution may be employed as a fluid flow passage comprising a combination of (i) hole and/or (ii) groove and/or (iii) tubular passage is provided in the upstream of the comparative resistance section 4 and a fluid flow passage comprising a combination of (i) hole and/or (ii) groove and/or (iii) tubular passage is provided in the downstream of the comparative resistance section 4, with the combination located in the downstream being either the same as or different from the combination located in the upstream.

Eighth Embodiment

The eighth embodiment of the invention related to the flow rate detecting element of the present application is schematically shown in FIGS. 1 and 2.

The invention related to the flow rate detecting element of the eighth embodiment is the flow rate detecting element of the seventh embodiment, wherein a flow passage having the form of (i) hole is provided in the upstream of the comparative resistance section 4 and a flow passage of at least one type selected from among a group consisting of (i) hole, (ii) groove and (iii) tubular passage is provided in the downstream of the comparative resistance section 4. Basic constitutions of the flow rate detecting element shown in FIGS. 1 to 6 are the same as those of the first to seventh embodiments. The forms of (i) hole, (ii) groove and (iii) tubular passage are also the same as those described in the seventh embodiment.

In the flow rate detecting element constituted as described above, since the hole is used as the fluid flow passage provided in the upstream and a passage of at least one type selected from hole, groove and tubular passage is used as the fluid flow passage provided in the downstream, the fluid can flow through the hole 9 located in the upstream into the recess 7 and flow out of the recess through the fluid flow passage of at least one type selected from hole, groove and tubular passage, thus securing a smooth passage for the fluid to flow into the recess 7. As a result, the comparative resistance section has an improved temperature response characteristic since the fluid can flow also to the lower surface of the comparative resistance section.

Ninth embodiment

The ninth embodiment of the invention related to the flow rate detecting element of the present application is schematically shown in FIG. 2.

The invention related to the flow rate detecting element of the ninth embodiment is the flow rate detecting element of the eighth embodiment, wherein a fluid flow passage 9 having a form of slit is provided in the upstream and the thin film layer is warped, at least in a part of the comparative resistance section, so as to be convex to the opposite side of the substrate.

The thin film layer can be formed into the shape shown in FIG. 2 by depositing the thin film layer on the upper surface side of the flat substrate 1 in such a way as tensile stress is generated in the support film 2 and compressive stress in the protective film 11. For this purpose, for example, silicon nitride can be used as the material of the support film 2 and silicon oxide can be used as the material of the protective film 11. Moreover, since the thin film layer has the hole 9 formed in slit shape as the fluid flow passage in the comparative resistance region 8 located in the upstream of the comparative resistance section 4, middle portion 12 of the diaphragm is warped to become convex on the upper side (fluid side) when formed into diaphragm structure due to the stress generated in the film.

In the flow rate detecting element constituted as described above, since the thin film layer is warped, at least in a part of the comparative resistance section, so as to be convex to the opposite side of the substrate, the fluid can flow more smoothly through the hole 9 of slit shape into the recess 7. As a result, the comparative resistance section has an improved temperature response characteristic since the fluid can flow more efficiently to the lower surface of the comparative resistance section.

Tenth Embodiment

The tenth embodiment of the invention related to the flow rate detecting element of the present application is schematically shown in FIG. 2.

The invention related to the flow rate detecting element of the tenth embodiment is the flow rate detecting element of the eighth embodiment, wherein a fluid flow passage having a form of slit is provided in the downstream.

Means for warping the thin film layer to become convex on the upper side (fluid side) is similar to that described in the ninth embodiment.

In the example shown in FIG. 2, the hole 9 having the form of slit is provided as the fluid flow passage in the comparative resistance region 8 in the downstream of the comparative resistance section 4.

In the flow rate detecting element constituted as described above, since both fluid flow passages in the upstream and the downstream are formed as the hole 9 in slit shape and the thin film layer is warped, at least in a part of the comparative resistance section, so as to be convex to the opposite side of the substrate, the fluid can flow more smoothly through the hole 9 into the recess 7. As a result, the comparative resistance section has an improved temperature response characteristic since the fluid can flow more efficiently to the lower surface of the comparative resistance section.

Eleventh Embodiment

The eleventh embodiment of the invention related to the flow rate detecting element of the present application is schematically shown in FIGS. 3, 4 and 6.

The invention related to the flow rate detecting element of the eleventh embodiment is the flow rate detecting element of the seventh embodiment, wherein a flow passage having the form of (ii) groove is provided in the upstream of the comparative resistance section 4 and a flow passage of at least one type selected from among a group consisting of (i) hole, (ii) groove and (iii) tubular passage is provided in the downstream of the comparative resistance section 4. Basic constitutions of the flow rate detecting element shown in FIGS. 1 to 6 are the same as those of the first and seventh embodiments. The forms of (i) hole, (ii) groove and (iii) tubular passage are also the same as those described in the seventh embodiment.

In the flow rate detecting element constituted as described above, since the groove is used as the fluid flow passage provided in the upstream and a passage of at least one type selected from hole, groove and tubular passage is used as the fluid flow passage provided in the downstream, the fluid can flow through the groove located in the upstream into the recess 7 and flow out of the recess 7 through the fluid flow passage of at least one type selected from hole, groove and tubular passage, thus securing a smooth passage for the fluid to flow into the recess. As a result, the comparative resistance section has an improved temperature response characteristic since the fluid can flow sufficiently also to the lower surface of the comparative resistance section.

Twelfth embodiment

The twelfth embodiment of the invention related to the flow rate detecting element of the present application is schematically shown in FIG. 6.

The flow rate detecting element according to the twelfth embodiment of the present invention is a variation of the flow rate detecting element of the eleventh embodiment, wherein the groove 16 used as the fluid flow passage is formed so that the sectional area thereof at the opening in the recess wall surface 6 facing the comparative resistance section or the end wall surface 18 of the substrate is larger than the sectional area of any other portion of the groove. Basic constitution of the flow rate detecting element is the same as those of the first and seventh embodiments. The forms of (i) hole, (ii) groove and (iii) tubular passage are also the same as those described in the seventh embodiment.

In the flow rate detecting element constituted as described above, since the sectional area of the groove 16 at the opening in the recess wall surface 6 facing the comparative resistance section or in the end wall surface 18 of the substrate is larger than the sectional area of any other portion of the groove, the fluid is made easier to flow into the groove and flow out of the groove. As a result, the comparative resistance section has an improved temperature response characteristic since the fluid can flow also to the lower surface of the comparative resistance section more smoothly.

Thirteenth Embodiment

The thirteenth embodiment of the invention related to the flow rate detecting element of the present application is schematically shown in FIG. 5.

The invention related to the flow rate detecting element of the thirteenth embodiment is the flow rate detecting element of the seventh embodiment, wherein a flow passage having the form of (iii) tubular passage 15 is provided in the upstream of the comparative resistance section 4 and a flow passage of at least one type selected from among a group consisting of (i) hole, (ii) groove and (iii) tubular passage is provided in the downstream of the comparative resistance section 4. Basic constitutions of the flow rate detecting element shown in FIGS. 1 to 6 are the same as those of the first and seventh embodiments. The forms of (i) hole, (ii) groove and (iii) tubular passage are also the same as those described in the seventh embodiment.

In the flow rate detecting element constituted as described above, since the tubular passage 15 is used as the fluid flow passage provided in the upstream and a passage of at least one type selected from hole, groove and tubular passage is used as the fluid flow passage provided in the downstream, the fluid can flow through the tubular passage located in the upstream into the recess and flow out of the recess 7 through the fluid flow passage of at least one type selected from hole, groove and tubular passage, thus securing a smooth passage for the fluid to flow into the recess 7. As a result, the comparative resistance section has an improved temperature response characteristic since the fluid can flow sufficiently also to the lower surface of the comparative resistance section.

Fourteenth Embodiment

The first embodiment of the invention of element holder for the flow rate detecting element of the present application will be described below with reference to FIGS. 7 and 8.

The invention related to the element holder according to the first embodiment comprises a flat substrate having a thin film layer consisting of a support film and a protective film both made of insulating material and laminated on one surface thereof, wherein a heating resistance section and a comparative resistance section are provided between the support film and the protective film of the thin film layer by forming the thermosensitive resistor in a predetermined pattern, the flat substrate has a recess which penetrates the flat substrate in the direction of thickness thereof in at least such portions thereof that face the heating resistance section and the comparative resistance section, and a fluid flow passage which communicates with the recess wall surface facing the comparative resistance section is provided to flow the fluid to the recess, so that the thermosensitive flow rate detecting element measures the flow rate or velocity of the fluid by means of the heating resistance section according to the report of fluid temperature sensed by the comparative resistance section, while the element holder has airfoil-shaped cross section with at least one gap opening provided in the holder surface in the upstream and the downstream portions with respect to the comparative resistance section.

The thermosensitive flow rate detecting element accommodated by the element holder of this invention may be any of the thermosensitive flow rate detecting elements which are generally used. Accordingly, the thermosensitive flow rate detecting element of the prior art described in conjunction with the related art is also included in the thermosensitive flow rate detecting element of the present application.

In FIG. 7, reference numeral 24 denotes a heating resistance section, 25 denotes a comparative resistance section, and 23 denotes the thermosensitive flow rate detecting element. This drawing shows only two elements of the heating resistance section and the comparative resistance section of the flow rate detecting element, for the convenience of explanation of the form of accommodating the flow rate detecting element in the element holder, although those skilled in the art will readily understand that the flow rate detecting element can be provided with other element as required.

The applicant of this patent application has already disclosed an application for patent of the element holder which accommodates the flow rate detecting element in Japanese Patent Kokai Publication No. 10-293052. As described in the specification, in case the thermosensitive flow rate detecting element is used as the air intake sensor of an automobile engine, for example, the thermosensitive flow rate sensor provided with the thermosensitive flow rate detecting element is accommodated in the element holder and is disposed in the downstream of an air cleaner element. Therefore, the flow rate of air intake can be determined as the intake air makes contact with the thermosensitive flow rate sensor accommodated in the element holder after passing through the air cleaner element. The element holder has an effect of straightening the fluid flow around the surface of the element holder, thereby improving the measurement sensitivity and SIN ratio, and also has an effect of reducing the change in the flow rate sensing characteristic due to deviation in the flow through the fluid flow passage.

The notion that the element holder of this invention has a form of airfoil as a whole means that the element holder has an effect of straightening the fluid flow around the surface of the element holder similarly to the invention disclosed in Japanese Patent Kokai Publication No. 10-293052. The term airfoil refers to the form of wing or fin known in the field of hydrodynamics, and may be any shape which has the effect of straightening the flow of fluid around thereof.

Figure 7A:
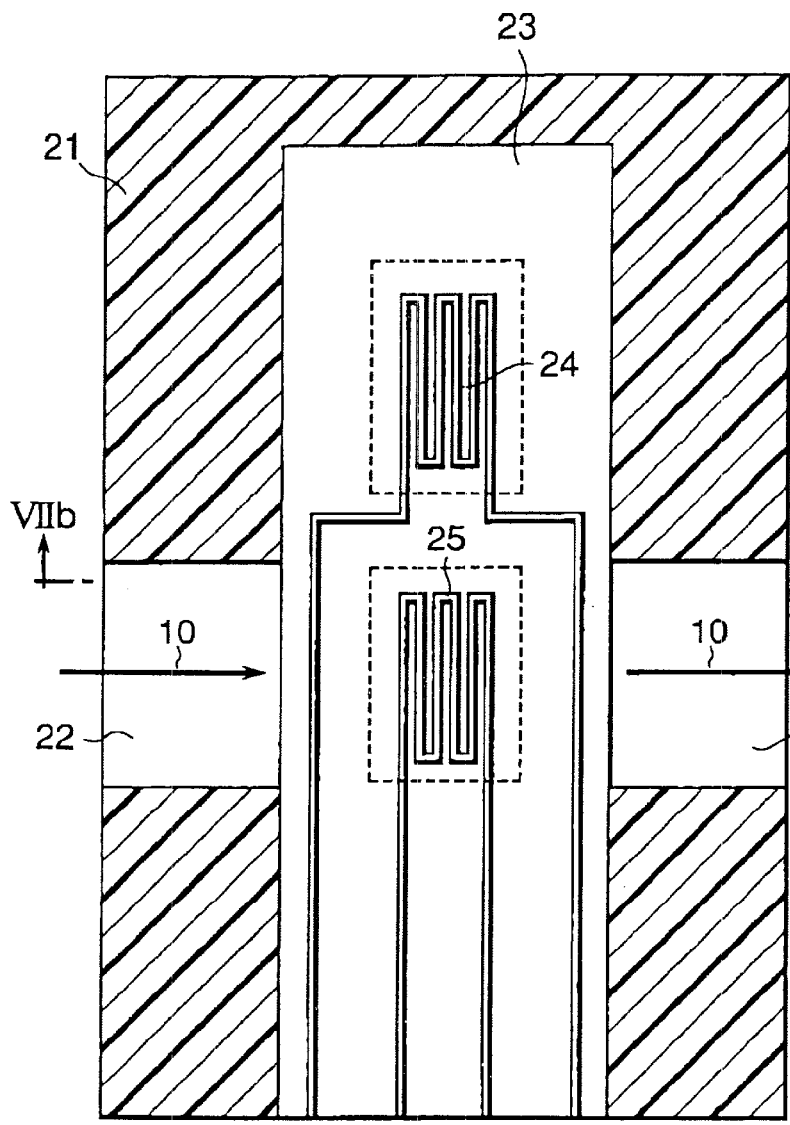
FIGS. 7a–7c are schematic diagrams showing a basic embodiment of the invention related to the element holder, particularly illustrating the features of the second and third embodiments of the element holder, FIG. 7a being a schematic plan view of the flow rate detecting element and the element holder which accommodates the flow rate detecting element being cut away by a horizontal surface at the same height as the top surface of the flow rate detecting element, FIG. 7b being a sectional view taken along lines VIIb—VIIb in FIG. 7a, and FIG. 7c being a sectional view taken along lines VIIa—VIIa in FIG. 7b.

The element holder also has at least one gap opening provided in the holder surface in the upstream and the downstream portions with respect to the comparative resistance section of the flow rate detecting element accommodated therein as shown in FIGS. 7a and 8a. The term "accommodate" means that the flow rate detecting element is installed in the element holder and is used in the state of being integrated therewith, while the flow rate detecting element may be contained within the element holder without any part of the flow rate detecting element being exposed to the outside, or may be contained within the element holder with at least a part of the flow rate detecting element being exposed to the outside.

The gap opening provided in the element holder may be located at a position which corresponds to the upper surface of the flow rate detecting element accommodated therein, or located at a position which corresponds to the end wall surface of the substrate of the flow rate detecting element accommodated therein, or located in the lower surface of the substrate or at a lower position of the flow rate detecting element accommodated therein. Moreover, position of the opening provided in the holder surface in the upstream with respect to the comparative resistance section in one element holder and the position of the gap opening located in the downstream may or may not be the same.

According to the invention related to the element holder of this application, since it is aimed at to measure the fluid temperature as accurately as possible while keeping the fluid in good contact with the flow rate detecting element accommodated therein and, based on this measurement, to measure the flow rate of the fluid as accurately as possible, any configuration which has the gap openings provided so as to achieve this function is considered to be included in the scope of this invention.

When the element holder of this invention accommodates the flow rate detecting element described in this application:

(a) in case the flow rate detecting element has the fluid flow passage in the form of (i) hole which penetrates the thin film layer in the direction of thickness thereof and allows the fluid to flow between the upper surface and the lower surface of the thin film layer, then the element holder preferably has a matching gap opening at a position which corresponds to the upper surface of the flow rate detecting element accommodated therein;

(b) in case the flow rate detecting element has the fluid flow passage in the form of (ii) at least one groove which communicates between the recess wall surface that faces the comparative resistance section and one end wall surface of the substrate on the surface of the substrate opposite to the thin film layer, then the element holder preferably has a matching gap opening at a position which corresponds to the end wall surface of the substrate of the flow rate detecting element accommodated therein; and (c) in case the flow rate detecting element has the fluid flow passage in the form of (iii) at least one tubular passage which communicates between the recess wall surface that faces the comparative resistance section and one end wall surface of the substrate, then the element holder preferably has a matching gap opening in the lower surface of the substrate or at a lower position of the flow rate detecting element accommodated therein. This relationship may be applied similarly to the upstream and downstream of the comparative resistance section. Furthermore, the gap opening may be provided in the element holder at a position which corresponds to the fluid flow passage, also in case the flow rate detecting element has the fluid flow passage comprising a combination of (i) hole and/or (ii) groove and/or (iii) tubular passage in the upstream and/or the downstream of the comparative resistance section.

Location of the gap opening provided in the element holder is such a position as the fluid can be caused to flow only to the comparative resistance section 25 of the flow rate detecting element as shown in FIGS. 7a and 8a.

Figure 7C:
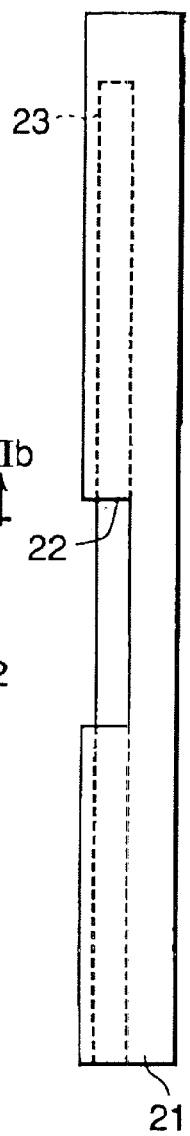
Figure 7B:
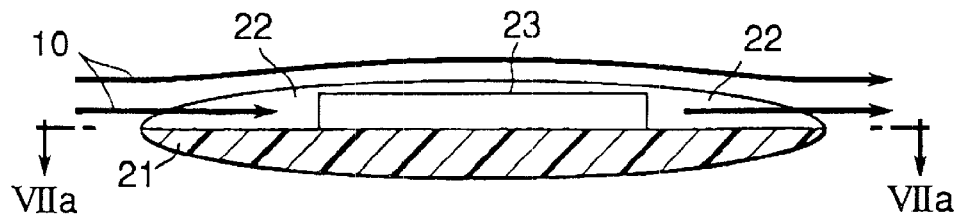

In the form shown in FIG. 7b, the gap openings 22 of the element holder 21 are provided at a position corresponding to the upper surface of the flow rate detecting element accommodated therein and at a position corresponding to the end wall surface of the substrate of the flow rate detecting element, in both the upstream and downstream of the comparative resistance section 25. As will be understood from FIG. 7c, the element holder 21 has the gap opening 22 which opens in the upper surface. As a result, the element holder 21 straightens the fluid flow and keeps the fluid in good contact with the flow rate detecting element in the gap opening 22.

In the form shown in FIG. 8b, the gap openings 26 of the element holder 21 are provided in the lower surface of the substrate of the flow rate detecting element accommodated therein or at a lower position, in both the upstream and downstream of the comparative resistance section 25. As will be understood from FIG. 8c, the element holder 21 has the gap opening 26 which opens in one end wall surface. As a result, the element holder 21 can straighten the fluid flow and keep the fluid in good contact with the flow rate detecting element in the gap opening 26.

Fifteenth Embodiment

The second embodiment of the invention of element holder for the flow rate detecting element of the present application will be described below with reference to FIG. 7.

The invention related to the element holder according to this embodiment is a variation of the element holder described in the fourteenth embodiment wherein the lower edge of the gap opening located in the upstream of the comparative resistance section is provided at a position which corresponds to the upper surface of the flow rate detecting element that is accommodated therein.

FIG. 7 is a schematic diagram showing the basic embodiment of the invention related to the element holder, in which FIG. 7a being a schematic plan view of the flow rate detecting element and the element holder 21 which accommodates the flow rate detecting element being cut away by a horizontal surface at the same height as the top surface of the flow rate detecting element, and FIG. 7b being a sectional view along line VIIb—VIIb in FIG. 7a.

FIG. 7a corresponds to the sectional view taken along lines VIIa—VIIa in FIG. 7b, showing the flow rate detecting element 23 enclosed by the element holder 21. FIG. 7c is an end view corresponding to FIG. 7a.

According to this invention, in case (a) wherein the flow rate detecting element has the fluid flow passage (not shown) in the form of (i) hole, which penetrates the thin film layer in the direction of thickness thereof and allows the fluid to flow between the upper surface and the lower surface of the thin film layer, provided in the upstream of the comparative resistance section 25 as the reference, the fluid can be smoothly directed to the surface of the flow rate detecting element by providing the gap opening 22 to the element holder 21 at a position corresponding to the upper surface of the flow rate detecting element accommodated therein, in correspondence to the fluid flow passage.

Sixteenth Embodiment

The third embodiment of the invention of element holder for the flow rate detecting element of the present application will be described below with reference to FIG. 7.

The invention related to the element holder according to this embodiment is a variation of the element holder described in the fourteenth embodiment wherein the lower edge of the gap opening 22 located in the upstream of the comparative resistance section 25 is provided at a position which corresponds to the end wall surface of the substrate of the flow rate detecting element that is accommodated therein.

According to this invention, in case (b) wherein the flow rate detecting element has the fluid flow passage (not shown) in the form of (ii) at least one groove, which communicates between the recess wall surface that faces the comparative resistance section and one end wall surface of the substrate on the surface of the substrate opposite to the thin film layer, provided in the upstream of the comparative resistance section 25 as the reference, then the fluid can be smoothly directed to the surface of the flow rate detecting element by providing the gap opening 22 to the element holder 21 at a position corresponding to the end wall surface of the substrate of the flow rate detecting element accommodated therein, in correspondence to the fluid flow passage.

Seventeenth Embodiment

The fourth embodiment of the invention of element holder for the flow rate detecting element of the present application will be described below with reference to FIG. 8.

The invention related to the element holder according to this embodiment is a variation of the element holder described in the fourteenth embodiment wherein the lower edge of the gap opening located in the upstream of the comparative resistance section is provided at a position which corresponds to the upper surface of the flow rate detecting element that is accommodated therein.

FIG. 8 is a schematic diagram showing the element holder according to this embodiment, in which FIG. 8a being a schematic plan view of the flow rate detecting element and the element holder which accommodates the flow rate detecting element being cut away by a horizontal surface at the same height as the top surface of the flow rate detecting element, FIG. 8b being a sectional view taken along lines VIIIb—VIIIb in FIG. 8a, and FIG. 8c being an end view corresponding to FIG. 8a. FIG. 8a corresponds to the sectional view taken along lines VIIIa—VIIIa in FIG. 8b.

According to this invention, in case (c) wherein the flow rate detecting element has the fluid flow passage (not shown) in the form of (iii) at least one tubular passage, which communicates between the recess wall surface that faces the comparative resistance section 25 and one end wall surface of the substrate, being provided in the upstream of the comparative resistance section 25 as the reference, the fluid can be smoothly directed to the surface of the flow rate detecting element by providing the gap opening 26 to the element holder 21 in the lower surface of the substrate of the flow rate detecting element accommodated therein or at a lower position, in correspondence to the fluid flow passage.

EXAMPLES

The temperature response characteristic of the flow rate detecting element and the element holder of the present application to changes in the fluid temperature was measured as follows.

In a flow rate measuring chamber such as a wind tunnel wherein a gas flow can be formed with a preset flow rate, the flow rate detecting element connected to a necessary electric circuit is installed and air of relatively low temperature is caused to flow therethrough with a preset flow rate. Then the air introduced into the chamber is switched to air heated to a predetermined temperature, and the change in resistance obtained from the flow rate detecting element is measured to determine the period of time required for the resistance to reach a constant value. This period is compared with the time obtained by a similar experiment conducted on the thermosensitive flow rate detecting element of the prior art used as a reference. Reduction in the time is given in terms of percentage improvement in the temperature response characteristic to the fluid temperature change.

Example 1

The flow rate detecting element and the element holder of the embodiment shown in FIG. 8 were fabricated. As for the dimensions of the opening provided in the element holder, dimensions of the opening 26 shown in FIG. 8c were set to W=2 mm and D=1 mm. The temperature response characteristic to the fluid temperature change was measured using this element holder. Improvement in the temperature response characteristic by 30% was obtained in comparison to the case of using the flow rate detecting element and the element holder of the prior art.

The flow rate detecting element of the present invention has a better temperature response characteristic for making quick response to the change in the fluid temperature to be measured, as described above, and therefore can be used for measuring the flow rate of various fluids such as gases and/or liquids, preferably gases, and particularly air and/or a mixture of gases, to measure the flow rate of the fluid more accurately. Thus the flow rate detecting element of the present invention can be used preferably for measuring the flow rate of, in particular, the air intake into an internal combustion engine which requires accurate measurement at all times.

Also the element holder of the present invention can be preferably used for the flow rate sensor of an internal combustion engine in particular, since the element holder straightens the fluid flow while accommodating the flow rate detecting element and keeps the fluid in good contact between the flow rate detecting element and the fluid.

What is claimed is:

1. A thermosensitive flow rate detecting element comprising:
   a flat substrate having a surface and end wall transverse to the surface;
   a thin film layer comprising an insulating support film and an insulating protective film on the surface of the flat substrate;
   a heating resistance section including a thermally sensitive resistor having a pattern and a comparative resistance section including a thermally sensitive resistor having a pattern, the heating resistance section and the comparative resistance section being disposed between the support film and the protective film of the thin film layer;
   a recess which penetrates the flat substrate in a thickness direction and faces the heating resistance section and the comparative resistance section; and
   at least one fluid flow passage through which the recess is in fluid communication with one of a surface of the thin film layer facing away from the recess and one of the end wall surfaces of the substrate, wherein the thermosensitive flow rate detecting element measures one of flow rate and velocity of the fluid, using the heating resistance section, according to fluid temperature sensed by the comparative resistance section.

2. The flow rate detecting element according to claim 1, having at least two fluid flow passages.

3. The flow rate detecting element according to claim 1, wherein at least one fluid flow passage is provided upstream of the comparative resistance section relative to flow direction of the fluid.

4. The flow rate detecting element according to claim 1, wherein at least one fluid flow passage is provided downstream of the comparative resistance section relative to flow direction of the fluid.

5. The flow rate detecting element according to claim 1, wherein the comparative resistance section and the heating resistance section are disposed on a line crossing flow direction of the fluid.

6. The flow rate detecting element according to claim 1, wherein the comparative resistance section and the heating resistance section are disposed on a line perpendicular to flow direction of the fluid.

7. A thermosensitive flow rate detecting element comprising:
   a flat substrate having opposed first and second surfaces and end wall surfaces transverse to the first and second surfaces;
   a thin film layer comprising an insulating support film and an insulating protective film on the first surface of the flat substrate;
   a heating resistance section including a thermally sensitive resistor having a pattern and a comparative resistance section including a thermally sensitive resistor having a pattern, the heating resistance section and the comparative resistance section being disposed between the support film and the protective film of the thin film layer;
   a recess which penetrates the flat substrate in a thickness direction and faces the heating resistance section and the comparative resistance section; and
   at least two fluid flow passages through which the recess is in fluid communication with one of a surface of the thin film layer facing away from the recess and one of the end wall surfaces of the substrate, a first of the two fluid flow passages being upstream of the comparative resistance section and a second of the fluid flow passages being downstream of the comparative resistance section, wherein
   the thermosensitive flow rate detecting element measures one of flow rate and velocity of the fluid, using the heating resistance section, according to fluid temperature sensed by the comparative resistance section, and
   the first of the fluid flow passages is selected from the group consisting of (i) a first hole which penetrates the thin film layer in a thickness direction so the fluid flows across the thin film layer on upper and lower surfaces of the thin film layer, (ii) at least one groove in the flat substrate and which communicates between a recess wall surface that faces the comparative resistance section and one of the end wall surfaces of the substrates, on the second surface of the flat substrate, and (iii) at least one tubular passage within the flat substrate and which communicates between the recess wall surface facing the comparative resistance section and one of the end wall surfaces of the substrate.

8. The flow rate detecting element according to claim 7, wherein the first of the fluid flow passages is the first hole and the second of the fluid flow passages is selected from the group consisting of (i) a second hole which penetrates the thin film layer in the thickness direction so the fluid flows across the thin film layer between the upper surface and the lower surface, (ii) at least one groove in the flat substrate and which communicates between the recess wall surface that faces the comparative resistance section and one of the end wall surfaces of the substrate, on the second surface of the substrate, and (iii) at least one tubular passage within the flat substrate and which communicates between the recess wall surface that faces the comparative resistance section and one of the end wall surfaces of the substrate.

9. The flow rate detecting element according to claim 8, wherein the second of the fluid flow passages is the second hole and each hole of the first and second fluid flow passages is a slit in the thin film layer extending transverse to fluid flow direction.

10. The flow rate detecting element according to claim 9, wherein the thin film layer is warped, at least in a part of the comparative resistance section, and is convex relative to the second side of the substrate.

11. The flow rate detecting element according to claim 7, wherein the first of the fluid flow passages includes the at least one groove, and the second of the fluid flow passages is selected from the group consisting of;

(i) a second hole which penetrates the thin film layer in the thickness direction so the fluid flows across the thin film layer on the upper surface and the lower surface, (ii) at least one groove in the flat substrate and which communicates between the recess wall surface facing the comparative resistance section and one of the end wall surfaces of the substrate, on the second surface of the substrate, and (iii) at least one tubular passage within the flat substrate and which communicates between the recess wall surface that faces the comparative resistance section and one of the end wall surfaces of the substrate.

12. The flow rate detecting element according to claim 11, wherein the groove of the first fluid flow passage has a sectional area at an opening larger than sectional areas of any other portion of the groove.

13. The flow rate detecting element according to claim 7, wherein the first of the fluid flow passages includes the at least one tubular passage, and the second of the fluid flow passages is selected from the group consisting of (i) a second hole which penetrates the thin film layer in the thickness direction so the fluid flows across the thin film layer on the upper surface and the lower surface, (ii) at least one groove in the flat substrate and which communicates between the recess wall surface that faces the comparative resistance section and one of the end wall surfaces of the substrate, on the second surface of the substrate, and (iii) at least one tubular passage within the flat substrate and which communicates between the recess wall surface that faces the comparative resistance section and one of the end wall surfaces of the substrate.

14. An assembly including an element holder accommodating a thermosensitive flow rate detecting element, wherein the thermosensitive flow rate detecting element comprises:

a flat substrate including a surface and end walls and having a thin film layer comprising an insulating support film and an insulating protective film laminated on the surface of the flat substrate;

a heating resistance section including a thermally sensitive resistor having a pattern and a comparative resistance section including a thermally sensitive resistor having a pattern, the heating resistance section and the comparative resistance section being disposed between the support film and the protective film of the thin film layer;

a recess which penetrates the flat substrate in a thickness direction and faces the comparative resistance section, and at least two fluid flow passages through which the recess is in fluid communication with one of a surface of the thin film layer facing away from the recess and one of the end wall surfaces of the substrate, wherein the flow rate detecting element measures one of flow rate and velocity of the fluid, using the heating resistance section, according to fluid temperature sensed by the comparative resistance section; and the element holder has a cross section with an airfoil shape and at least one gap opening in each of upstream and downstream portions with respect to the comparative resistance section.

15. The assembly according to claim 14, wherein a lower edge of the gap opening located upstream of the comparative resistance section is located at a position which corresponds to an upper surface of the flow rate detecting element accommodated in the holder.

16. The assembly according to claim 14, wherein a lower edge of the gap opening located upstream of the comparative resistance section is located at a position which corresponds to an end wall surface of the substrate of the flow rate detecting element that is accommodated in the holder.

17. The assembly according to claim 14, wherein a lower edge of the gap opening located upstream of the comparative resistance section is located at or below a lower surface of the substrate of the flow rate detecting element that is accommodated in the holder.

* * * * *

UNITED STATES PATENT AND TRADEMARK OFFICE
CERTIFICATE OF CORRECTION

PATENT NO.    : 6,615,655 B1
DATED         : September 9, 2003
INVENTOR(S)   : Sakai et al.

It is certified that error appears in the above-identified patent and that said Letters Patent is hereby corrected as shown below:

<u>Title page,</u>
Item [56], References Cited, U.S. PATENT DOCUMENTS, add:

-- 4,501,144     2/1985          Higashi et al. --.
FOREIGN PATENT DOCUMENTS, add:

| -- 5-7659 | 1/1993 | Japan | Honeywell, Inc. |
| 9-329478 | 12/1997 | Japan | Tokyo Gas Co. Ltd. |
| 10-221142 | 8/1998 | Japan | Omron Corp.; Tokyo Gas Co. Ltd. |
| 10-260068 | 9/1998 | Japan | Ricoh Co., Ltd. |
| 10-293052 | 11/1998 | Japan | Mitsubishi Denki Kabushiki Kaisha |
| 11-23338 | 1/1999 | Japan | Mitsubishi Denki Kabushiki Kaisha --. |

OTHER PUBLICATIONS, add:

-- OHJI, H. et al.; "Fabrication of Accelerometer Using Single-Step Electrochemical Etching for Micro Structures (SEEMS)", <u>IEEE</u>, pp. 61-65 (1999);

MATSUURA, T. et al.; "Deformation control of microbridges for flow sensors", <u>Elsevier Science S.A.</u>, pp. 197-201 (1997) --.

Signed and Sealed this

Fourth Day of May, 2004

JON W. DUDAS
*Acting Director of the United States Patent and Trademark Office*